(12) United States Patent
Duarte et al.

(10) Patent No.: US 8,547,244 B2
(45) Date of Patent: Oct. 1, 2013

(54) ENHANCED VISUAL FEEDBACK FOR TOUCH-SENSITIVE INPUT DEVICE

(75) Inventors: Matias Gonzalo Duarte, Sunnyvale, CA (US); Daniel Marc Gatan Shiplacoff, Los Angeles, CA (US); Jeremy Godfrey Lyon, Sunnyvale, CA (US); Peter Skillman, San Carlos, CA (US); Dianne Parry Dominguez, Beverly Hills, CA (US); Richard R. Dellinger, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 798 days.

(21) Appl. No.: 12/341,514

(22) Filed: Dec. 22, 2008

(65) Prior Publication Data

US 2010/0156656 A1    Jun. 24, 2010

(51) Int. Cl.
    *G08B 5/00*      (2006.01)
    *G06F 3/041*      (2006.01)

(52) U.S. Cl.
    USPC ........ 340/815.4; 345/173; 345/176; 715/701; 341/20

(58) Field of Classification Search
    USPC ...................................................... 340/815.4
    See application file for complete search history.

(56) References Cited

U.S. PATENT DOCUMENTS

| | | | |
|---|---|---|---|
| 6,323,846 B1 | 11/2001 | Westerman et al. | |
| 6,525,717 B1 * | 2/2003 | Tang | 345/177 |
| 6,570,557 B1 | 5/2003 | Westerman et al. | |
| 6,677,932 B1 | 1/2004 | Westerman | |
| 7,030,861 B1 | 4/2006 | Westerman et al. | |
| 7,362,221 B2 | 4/2008 | Katz | |
| 7,479,949 B2 | 1/2009 | Jobs et al. | |
| 2004/0119688 A1 | 6/2004 | Troxell et al. | |
| 2005/0003851 A1 | 1/2005 | Chrysochoos et al. | |
| 2005/0057524 A1 | 3/2005 | Hill et al. | |
| 2006/0026521 A1 * | 2/2006 | Hotelling et al. | 715/702 |
| 2006/0053387 A1 | 3/2006 | Ording | |
| 2006/0085757 A1 | 4/2006 | Andre et al. | |
| 2006/0097991 A1 | 5/2006 | Hotelling et al. | |
| 2006/0197753 A1 | 9/2006 | Hotelling | |
| 2006/0267951 A1 | 11/2006 | Rainisto | |
| 2007/0046643 A1 | 3/2007 | Hillis et al. | |
| 2007/0152977 A1 | 7/2007 | Ng et al. | |
| 2007/0152984 A1 | 7/2007 | Ording et al. | |
| 2007/0273668 A1 | 11/2007 | Park et al. | |
| 2008/0055263 A1 * | 3/2008 | Lemay et al. | 345/173 |

(Continued)

FOREIGN PATENT DOCUMENTS

KR    10-2008-0089615    10/2007

OTHER PUBLICATIONS

European Search Report and Written Opinion dated Jun. 21, 2012 in European Application No. EP 09 83 5619.

*Primary Examiner* — Donnie Crosland

(57) ABSTRACT

A touch-sensitive input device provides improved visual feedback at (or near) the point and time of contact. As the user touches a touch-sensitive screen or pad, a portion of the screen or pad changes in visual appearance to indicate that the input has been received. In one embodiment, the change in visual appearance is localized to an area proximate to the point of contact. In one embodiment, the change in visual appearance is accomplished by illuminating an area proximate to and centered around the point of contact. In another embodiment, the change in visual appearance is accomplished by illuminating one or more illuminable elements, such as light-emitting diodes (LEDs) on the touch-sensitive pad.

21 Claims, 26 Drawing Sheets

(56) References Cited

U.S. PATENT DOCUMENTS

| | | |
|---|---|---|
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0082930 A1 | 4/2008 | Omernick et al. |
| 2008/0084397 A1 | 4/2008 | On et al. |
| 2008/0084400 A1 | 4/2008 | Rosenberg |
| 2008/0297484 A1 | 12/2008 | Park et al. |
| 2008/0303794 A1 | 12/2008 | Bolt et al. |
| 2008/0316183 A1 | 12/2008 | Westerman et al. |

* cited by examiner

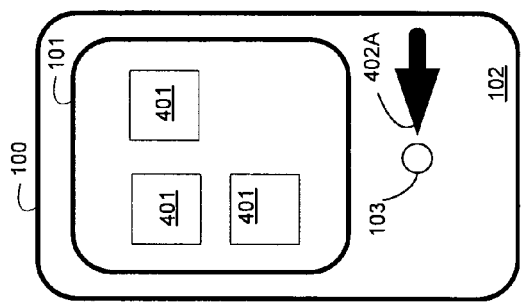
*FIG. 4A*
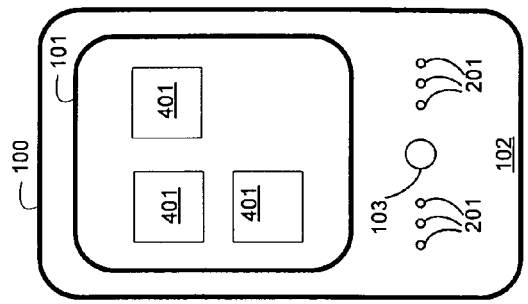
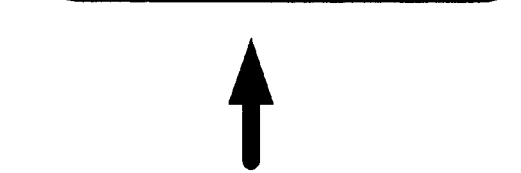
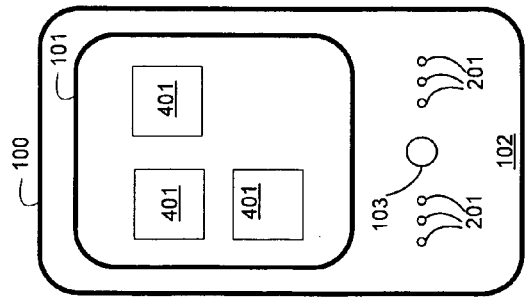
*FIG. 4B*

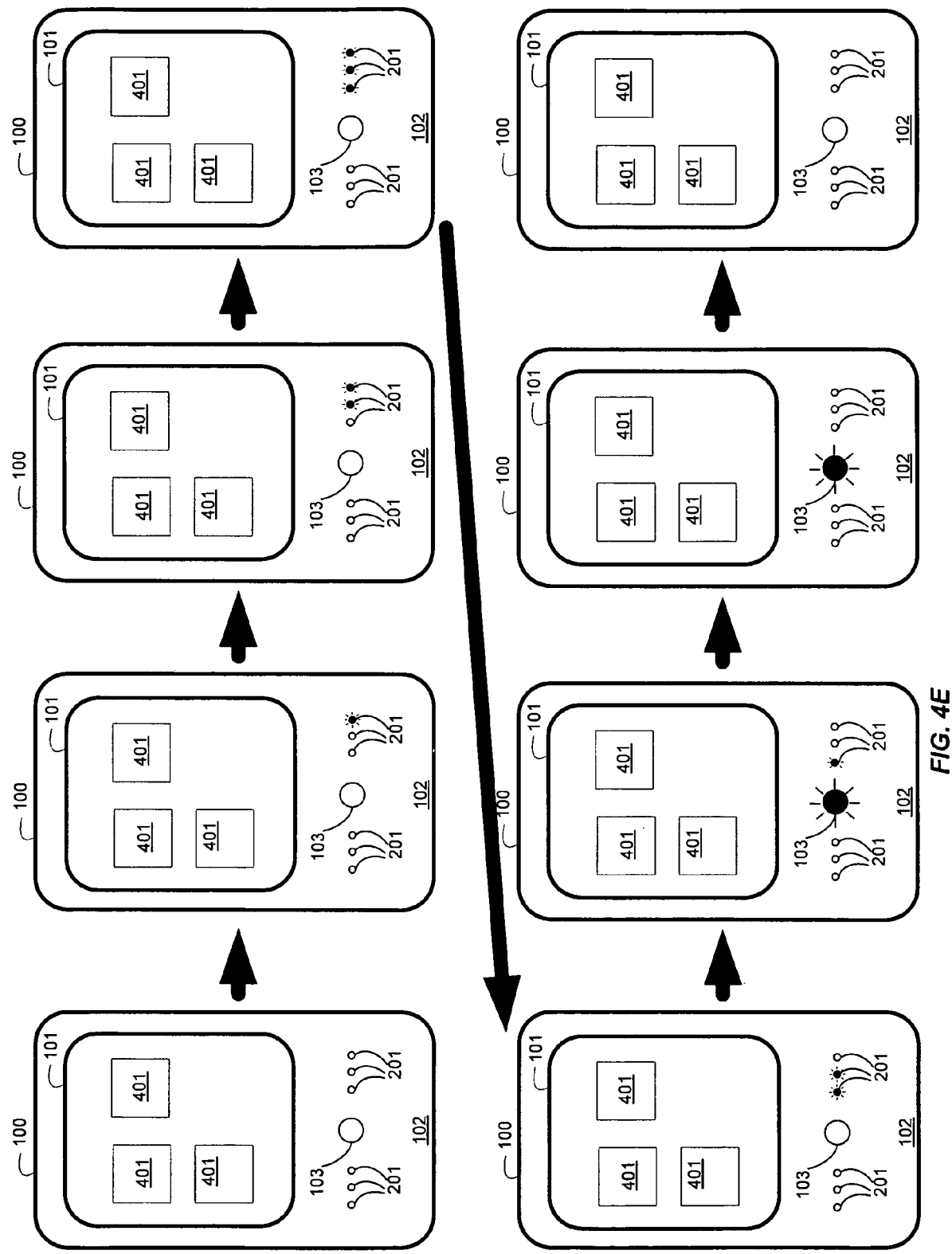

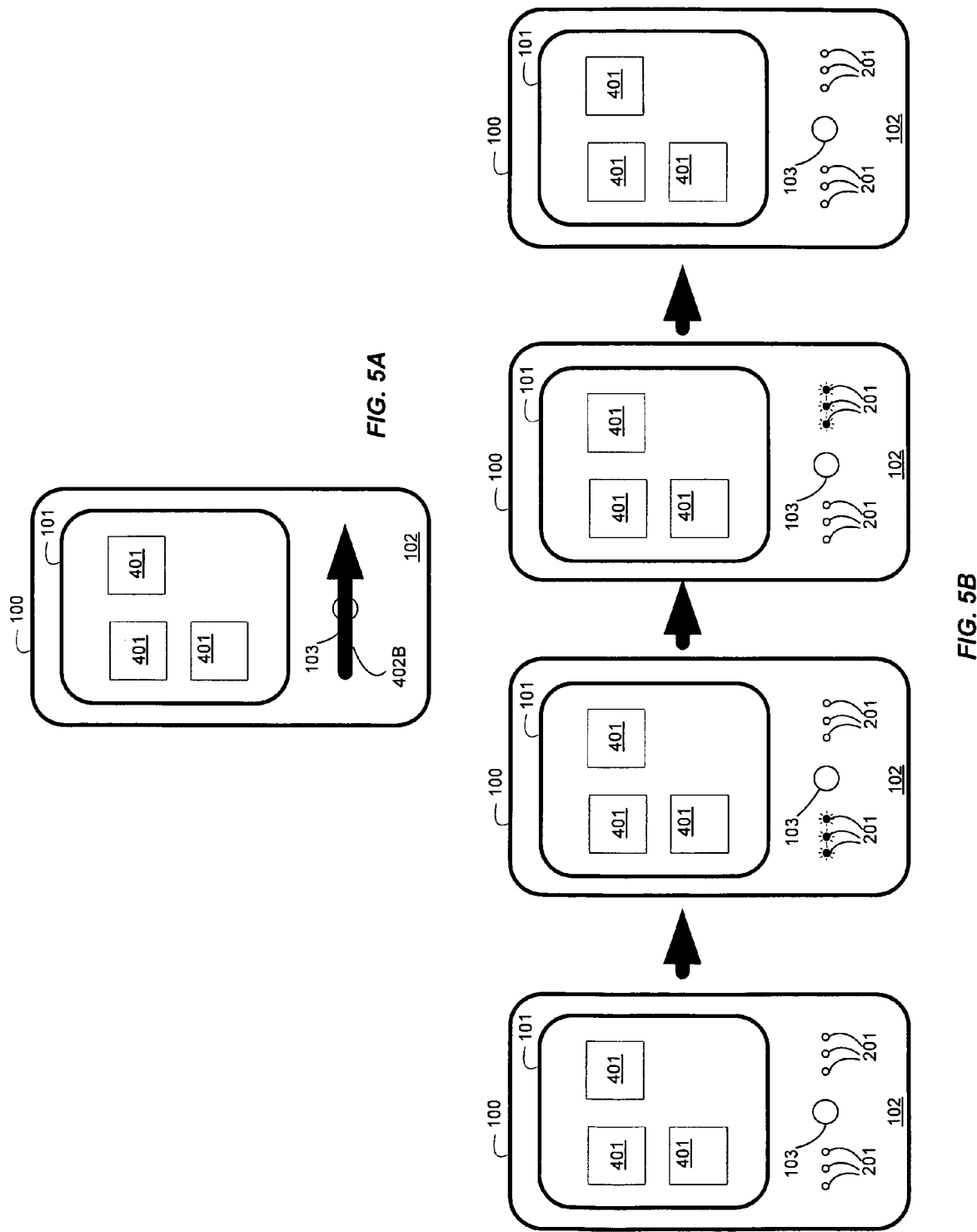

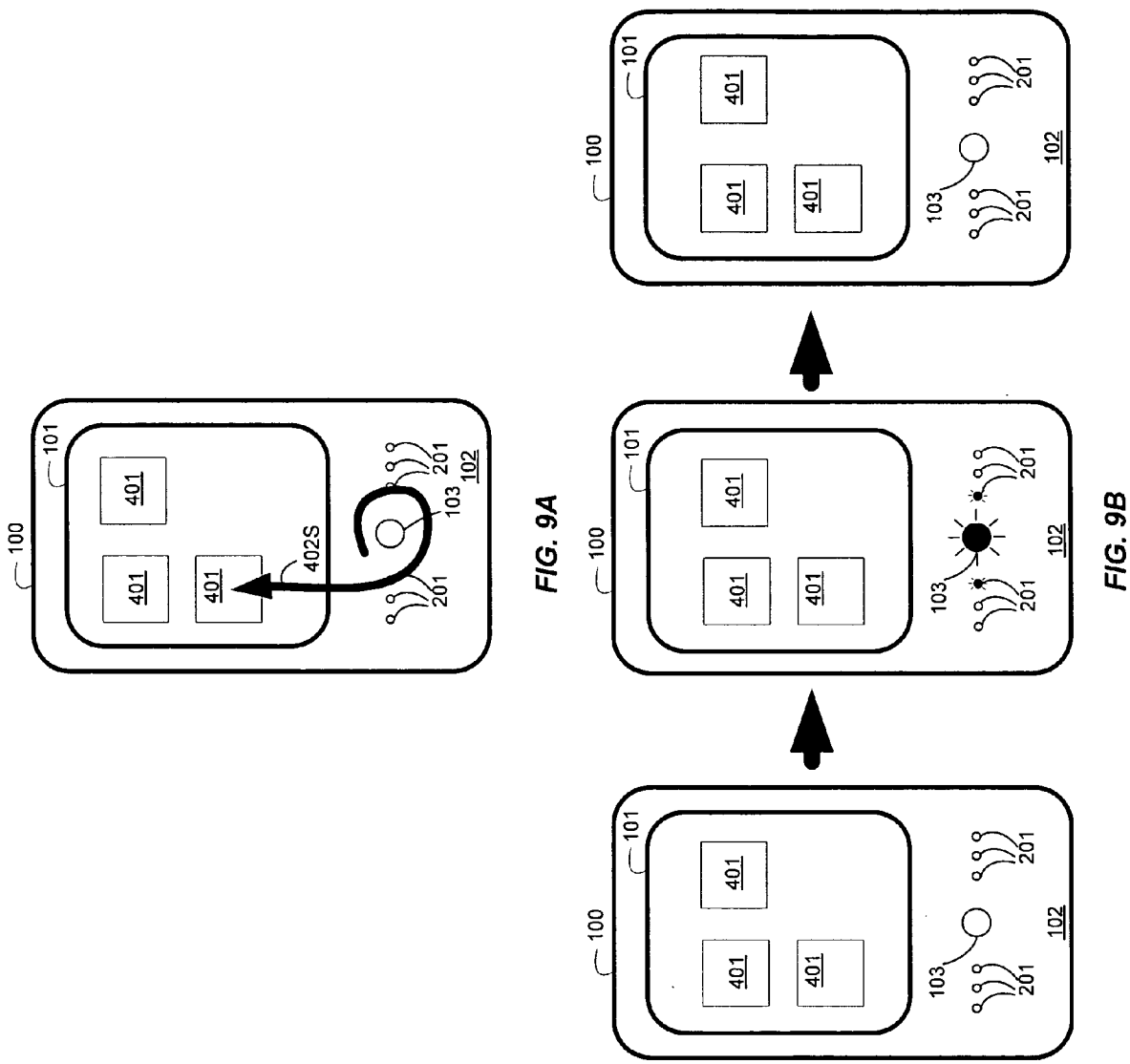

ENHANCED VISUAL FEEDBACK FOR TOUCH-SENSITIVE INPUT DEVICE

CROSS-REFERENCE TO RELATED APPLICATION

The present application is related to U.S. patent application Ser. No. 12/115,992, filed May 6, 2008 for "Extended Touch-Sensitive Control Area for Electronic Device", the disclosure of which is incorporated herein by reference.

The present application is related to U.S. patent application Ser. No. 11/379,552, filed Apr. 20, 2006 for "Keypad and Sensor Combination to Provide Detection Region that Overlays Keys", the disclosure of which is incorporated herein by reference.

The present application is related to U.S. patent application Ser. No. 11/948,885, filed Nov. 30, 2007 for "Computing Device that Determines and Uses Applied Pressure from User Interaction with an Input Interface", the disclosure of which is incorporated herein by reference.

The present application is related to U.S. patent application Ser. No. 11/849,133, filed Aug. 31, 2007 for "Soft-User Interface Feature Provided in Combination with Pressable Display Surface", the disclosure of which is incorporated herein by reference.

The present application is related to U.S. Pat. No. 6,816,154, filed May 30, 2001, issued Nov. 9, 2004, for "Optical Sensor-Based User Interface for a Portable Device", the disclosure of which is incorporated herein by reference.

The present application is related to U.S. Pat. No. 6,992,659, filed May 22, 2001, issued Jan. 31, 2006, for "High Transparency Integrated Enclosure Touch Screen Assembly for a Portable Hand Held Device", the disclosure of which is incorporated herein by reference.

The present application is related to U.S. Pat. No. 7,006,080 filed Feb. 19, 2002, issued Feb. 28, 2006, for "Display System", the disclosure of which is incorporated herein by reference.

FIELD OF THE INVENTION

In various embodiments, the present invention relates to input mechanisms for controlling electronic devices, and more particularly to a touch-sensitive input device that provides enhanced visual feedback.

DESCRIPTION OF THE RELATED ART

It is well-known to provide touch-sensitive screens for electronic devices. Touch-sensitive screens allow an electronic display to function as an input device, thus providing great flexibility in the type of interactions that can be supported. In many devices, touch-sensitive screens are used to replace pointing devices such as trackballs, mice, five-way switches, and the like. In other devices, touch-sensitive screens can supplement, or be supplemented by, other input mechanisms.

Touch-sensitive screens provide several advantages over other input mechanisms. Touch-sensitive screens can replace physical buttons by providing on-screen buttons that can be touched by the user. The on-screen buttons can be arranged so that they resemble an alphabetic or numeric keyboard, or they can have specialized functions. This often simplifies input operations by providing only those options that are relevant at a given time.

Touch-sensitive screens can also help to provide customizability and globalization of input mechanisms. An on-screen keyboard can be easily adapted to any desired language, and extra keys can be provided as appropriate to the specific application. Certain buttons can be highlighted, moved, or otherwise modified in a dynamic way to suit the application.

In addition, touch-sensitive screens can be more reliable than physical keyboards, because they reduce the reliance on moving parts and physical switches.

One particular advantage of touch-sensitive screens is that they allow direct manipulation of on-screen objects, for example by facilitating control and/or activation of such objects by touching, tapping, and/or dragging. Thus, when a number of items are displayed on a screen, touch-sensitivity allows a user to perform such operations on specific items in a direct and intuitive way.

However, some operations in connection with control of an electronic device are not particularly well suited to direct manipulation. These include operations that affect the entire screen, application environment, or the device itself. On-screen buttons can be provided to allow access to such operations, but such buttons occupy screen space that can be extremely valuable, especially in compact, mobile devices. In addition, providing on-screen buttons for such functions allows only a limited set of operations to be available at any given time, since there is often insufficient screen space to provide buttons for all such functions.

In some cases, on-screen buttons or objects are relatively small, causing some users to have difficulty activating the correct command or object, or even causing them to inadvertently cause the wrong command or object to be activated or manipulated. This problem, which is particularly prevalent in devices having small screens, can cause touch-screens to be relatively unforgiving in their interpretation of user input. In addition, as a natural consequence of combining an output device with an input device in the same physical space, the use of a touch-screen often causes users to obscure part of the screen in order to interact with it. Screens layouts may be designed so that important elements tend not to be obscured; however, such design may not take into account right- or left-handedness.

Another disadvantage of touch-sensitive screens is that their dynamic nature makes it difficult for users to provide input without looking at the screen. A user cannot normally discern the current state of the device without looking at it, and therefore cannot be sure as to the current location or state of various on-screen buttons and controls at any given time. This makes it difficult to control the device while it is one's pocket, or while one is engaged in a task that inhibits one's ability to look at the device.

It is known to provide touch-sensitive input devices in the form of a flat input pad. The user touches the touch-sensitive pad, for example to control cursor movement on a display screen. Many laptop computers employ such an input device in lieu of a mouse or trackball, so as to provide a cursor control mechanism that is compact and easy to use with no moving parts. Touch-sensitive pads can also be used in connection with a stylus or finger to enter gestures that are interpreted as commands or other input by an electronic device. One well known system for such use of a touch-sensitive pad is the Graffiti text entry system offered in many personal digital assistants (PDAs) based on the Palm Operating System developed by Palm, Inc. of Sunnyvale, Calif.

Touch-sensitive screens and pads often do not provide users with sufficient feedback to assure the user that the user's input has been recognized. In particular, touch-sensitive pads often have no output mechanism to offer any visual feedback at the point of contact. The lack of visual feedback can lead to uncertainty as to whether the user's input has been received or recognized.

In addition, conventional touch-sensitive screens and pads often do not provide a mechanism to distinguish between different types of tactile input. For example, a touch on an on-screen object may signify the user's intention to select the object or to activate it; however, many conventional touch-sensitive screens provide no reliable mechanism for distinguishing between these two actions with respect to the on-screen object. Double-clicking is known in conventional computer-based graphical user interfaces to signify an activation action in certain contexts; however, double-clicking is often perceived as cumbersome in a touch-based interface for a handheld device, and/or is often reserved for other use.

In some cases, different commands can be initiated depending upon how long a user maintains contact with the touch-sensitive screen or pad before releasing or moving. One command can be initiated by a tap action, while a different command can be initiated by a tap-and-hold, where the user maintains contact for some period of time. However, without adequate feedback a user may be unsure as to whether he or she has held the point of contact long enough to activate a tap-and-hold action rather than a tap action.

What is needed is a system and method that provides the advantages of touch-sensitive screens and touch-sensitive pads while avoiding their limitations. What is further needed is a system and method for providing instantaneous visual feedback at the point of contact with a touch-sensitive pad. What is further needed is a system and method for distinguishing between different types of input actions on a touch-sensitive screen and a touch-sensitive pad, in an intuitive manner and with minimal burden imposed on the user.

SUMMARY OF THE INVENTION

According to various embodiments of the present invention, a touch-sensitive input device provides improved visual feedback at (or near) the point and time of contact. As the user touches a touch-sensitive screen or pad, a portion of the screen or pad changes in visual appearance to indicate that the input has been received. In one embodiment, the change in visual appearance is localized to an area proximate to the point of contact. In one embodiment, the change in visual appearance is accomplished by illuminating an area proximate to and centered around the point of contact. In another embodiment, the change in visual appearance is accomplished by illuminating one or more illuminable elements, such as light-emitting diodes (LEDs) on the touch-sensitive pad.

In various embodiments, the present invention thus provides visual feedback to the user in response to user input provided on a touch-sensitive screen and/or pad. On a touch-sensitive screen, feedback can be provided by redrawing the screen area appropriately to indicate that the input has been received, even though there may be latency (either inherent to the system or introduced through visual transitions or transformations) before executing the action associated with the user's input. On a touch-sensitive pad (also referred to as a gesture area) that does not include a display screen, feedback is provided by illuminating elements such as LEDs which are aesthetically incorporated into the product design. By sequentially modulating individual LED brightnesses in distinct sequences, feedback for different user input gestures may be provided in visually recognizable ways.

According to other embodiments of the present invention, a touch-sensitive input device distinguishes between different types of touch input, so as to perform different operations depending on the type of input received. In one embodiment, force sensitivity is incorporated so as to distinguish between a light touch and a firmer amount of pressure. In another embodiment, duration, area of contact, degree of force, or other characteristics of touch input are assessed and interpreted so as to initiate different operations depending on the particulars of the received input. For example, in one embodiment, a light touch can be interpreted as a selection of an on-screen object, while firmer pressure can be interpreted as an activation command. In another embodiment, a touch gesture consisting of two or more points of contact (such as two fingers) can be interpreted differently than a touch gesture consisting of a single point of contact (such as one finger). Appropriate visual feedback is provided to inform the user as to how the input action is being interpreted. For example, a higher degree of pressure or force can cause a greater degree of illumination (for example, by activation of a greater number of LEDs, or by increasing the intensity of illuminated LEDs).

According to other embodiments of the present invention, a touch-sensitive input device accepts commands via a touch-sensitive screen. In one embodiment, the touch-sensitive display screen is enhanced by a touch-sensitive control area that extends beyond the edges of the display screen. The touch-sensitive area outside the display screen, referred to as a "gesture area," allows a user to activate commands using a gesture vocabulary. Commands entered in the gesture area can be independent of the current contents of the display screen. Certain commands can therefore be made available at all times without taking up valuable screen space, an advantage that is of particular benefit for small mobile devices. The gesture area can provide feedback in the form of a change in visual appearance accomplished by, for example, illuminating an area proximate to and centered around the point of contact.

In other embodiments, a gesture area can be implemented as a touch-sensitive pad without the use of a touch-sensitive display screen. The feedback techniques described herein can be implemented accordingly.

In one embodiment, the present invention allows some commands to be activated by inputting a gesture within the gesture area. Other commands can be activated by directly manipulating on-screen objects, as in a conventional touch-sensitive screen. Yet other commands can be activated via a combination of these two input mechanisms. Specifically, the user can begin a gesture within the gesture area, and finish it on the screen (or vice versa), or can perform input that involves contemporaneous contact with both the gesture area and the screen. Since both the gesture area and the screen are touch-sensitive, the device is able to interpret input that includes one or both of these areas, and can perform whatever action is appropriate to such input. A gesture vocabulary can thereby be implemented, including commands for a) a gesture area implemented as a touch-sensitive pad, b) a touch-sensitive screen facilitating direct manipulation of on-screen objects; and/or c) a combination thereof. In one embodiment, the gesture area can provide appropriate visual feedback to acknowledge input provided thereon, and thereby confirm that a subsequent or contemporaneous input on the touch-sensitive screen may be modified based on the input provided via the gesture area.

In one embodiment, LEDs or other illuminable elements within the gesture area are used to provide user notification of pending events (such as IM, SMS, Missed call, low battery, and the like). Such notification is particularly useful when the device is in a sleep (power saving, screen off) mode so that the display screen may be off. When the device is in active use, such pending events can be displayed on-screen in the notification banner area. During sleep mode, when the screen is off, an indication of new pending messages or other events can be shown, in one embodiment, by illuminating LEDs in a recognizable pulse or other pattern.

Accordingly, the present invention provides improved feedback and flexibility, allowing for an enhanced user experience with minimal learning curve and confusion.

Additional advantages will become apparent in the following detailed description.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

FIG. 4A depicts an example of a half-swipe gesture that can be entered according to an embodiment of the invention.

FIGS. 4B through 4E depict examples of visual feedback for a half-swipe gesture, according to an embodiment of the invention.

FIG. 5A depicts an example of a full-swipe gesture that can be entered according to an embodiment of the invention.

FIGS. 5B through 5E depict examples of visual feedback for a full-swipe gesture, according to an embodiment of the invention.

FIGS. 9A and 9B depict an example of visual feedback to indicate detection of a clockwise orbit portion of a two-part command, according to an embodiment of the invention.

DETAILED DESCRIPTION OF THE EMBODIMENTS

Definitions

For purposes of the following description, the following terms are defined:

Touch-sensitive surface: a surface of a device that is capable of detecting contact;

Touch-sensitive screen: a touch-sensitive surface that also functions as a display screen;

Touch command: any command that is entered by the user by touching a touch-sensitive surface;

Direct manipulation: a touch command whose target is specified by contact with a element displayed on a touch-sensitive screen;

Gesture: a touch command that includes a distinctive motion that can be interpreted to specify which command is to be performed;

Gesture area (or touch-sensitive pad): a touch-sensitive surface that does not function as a display screen.

These terms are not intended to be limiting of the scope of the invention. For example, although the invention is described in the context of an embodiment wherein commands are detected by touching a surface, one skilled in the art will recognize that alternative embodiments are possible. For example, a user can make gestures above, next to, or proximate to a detection surface or device; such gestures can be detected and interpreted according to known techniques. Accordingly, the feedback mechanisms of the present invention can be implemented in any embodiment where user gestures are detected and interpreted, including non-touch architectures. Terms relating to touch input are used herein for clarity and are not intended to exclude non-touch embodiments.

System Architecture

In various embodiments, the present invention can be implemented on any electronic device, such as a handheld computer, personal digital assistant (PDA), personal computer, kiosk, cellular telephone, remote control, data entry device, and the like. For example, the invention can be implemented as a feedback mechanism for a software application or operating system running on such a device. Accordingly, the present invention can be implemented as part of a graphical user interface for controlling software on such a device.

In various embodiments, the invention is particularly well-suited to devices such as smartphones, handheld computers, and PDAs, which have limited screen space and in which a large number of commands may be available at any given time. One skilled in the art will recognize, however, that the invention can be practiced in many other contexts, including any environment in which it is useful to provide access to commands via a gesture-based input paradigm, while also allowing direct manipulation of on-screen objects where appropriate. Accordingly, the following description is intended to illustrate the invention by way of example, rather than to limit the scope of the claimed invention.

Figure 1:
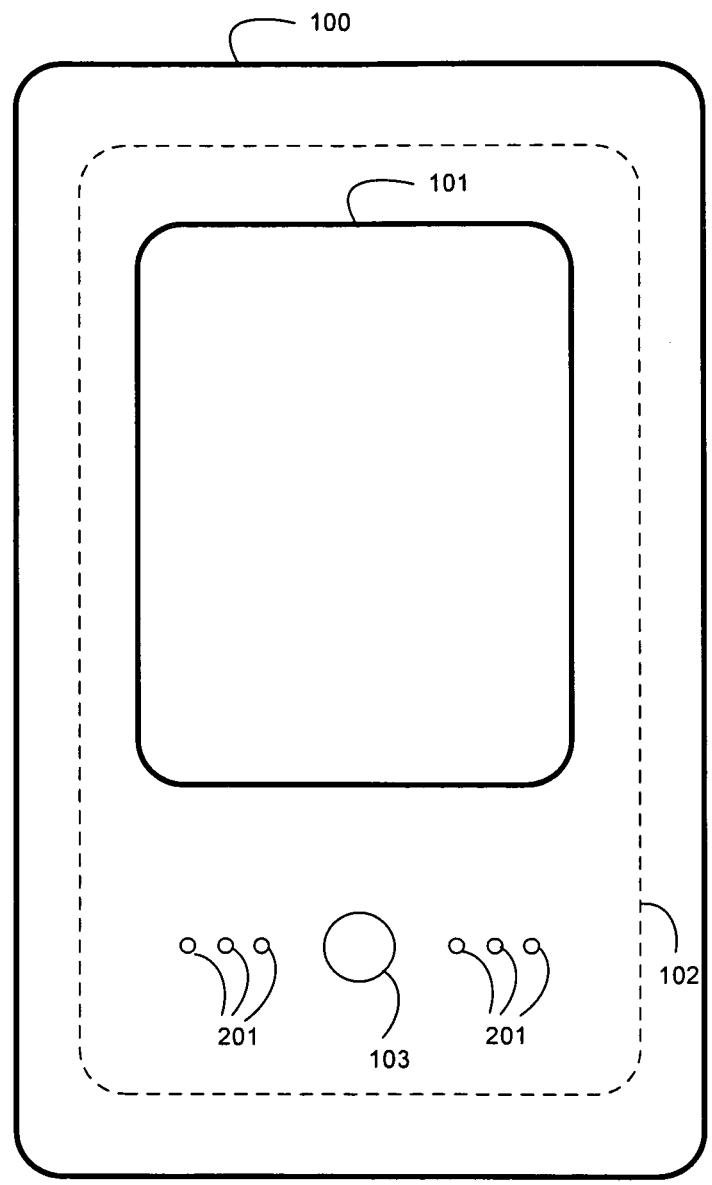
FIG. 1 depicts an example of a device having a touch-sensitive screen and a gesture area surrounding the touch-sensitive screen, including light-emitting diodes (LEDs) for visual feedback according to one embodiment.

Referring now to FIG. 1, there is shown an example of a device 100 having a touch-sensitive screen 101 and a gesture area 102, according to one embodiment. Device 100 is also equipped with light-emitting diodes (LEDs) 201 that illuminate to provide visual feedback indicating a current state of device 100 and/or indicating detection of user input, as described in more detail below.

For illustrative purposes, device 100 as shown in FIG. 1 is a personal digital assistant or smartphone. Such devices commonly have telephone, email, and text messaging capability, and may perform other functions including, for example, playing music and/or video, surfing the web, running productivity applications, and the like. The present invention can be implemented in any type of device having a touch-sensitive pad, and is not limited to devices having the listed functionality. In addition, the particular layout shown in FIG. 1 is merely exemplary and is not intended to be restrictive of the scope of the claimed invention. For example, any number of LEDs 201 can be used, and LEDs 201 can be arranged in any configuration and can have any shape; the linear configuration shown in FIG. 1 is merely one example. Other light sources or visual indicators can be used in place of LEDs.

In various embodiments, touch-sensitive screen 101 and gesture area 102 can be implemented using any technology that is capable of detecting a location of contact. One skilled in the art will recognize that many types of touch-sensitive screens and surfaces exist and are well-known in the art, including for example:

- capacitive screens/surfaces, which detect changes in a capacitance field resulting from user contact;
- resistive screens/surfaces, where electrically conductive layers are brought into contact as a result of user contact with the screen or surface;
- surface acoustic wave screens/surfaces, which detect changes in ultrasonic waves resulting from user contact with the screen or surface;
- infrared screens/surfaces, which detect interruption of a modulated light beam or which detect thermal induced changes in surface resistance;
- strain gauge screens/surfaces, in which the screen or surface is spring-mounted, and strain gauges are used to measure deflection occurring as a result of contact;
- optical imaging screens/surfaces, which use image sensors to locate contact;
- dispersive signal screens/surfaces, which detect mechanical energy in the screen or surface that occurs as a result of contact;
- acoustic pulse recognition screens/surfaces, which turn the mechanical energy of a touch into an electronic signal that is converted to an audio file for analysis to determine position of the contact; and
- frustrated total internal reflection screens, which detect interruptions in the total internal reflection light path.

Any of the above techniques, or any other known touch detection technique, can be used in connection with the device of the present invention, to detect user contact with screen 101, gesture area 102, or both.

In one embodiment, the present invention can be implemented using a screen 101 and/or gesture area 102 capable of detecting two or more simultaneous touch points, according to techniques that are well known in the art. The touch points can all be located on screen 101 or on gesture area 102, or some can be located on each.

In one embodiment, the present invention can be implemented using other gesture recognition technologies that do not necessarily require contact with the device. For example, a gesture may be performed over the surface of a device (either over screen 101 or gesture area 102), or it may begin over the surface of a device and terminate with a touch on the device (either on screen 101 or gesture area 102). It will be recognized by one with skill in the art that the techniques described herein can be applied to such non-touch-based gesture recognition techniques.

In one embodiment, device 100 as shown in FIG. 1 also has a physical button 103. In one embodiment, physical button 103 can be used to perform some common function, such as to return to a home screen or to activate a selected on-screen item. Physical button 103 is not needed for the present invention, and is shown for illustrative purposes only. In one embodiment, physical button 103 is touch sensitive, so that the user's gestures as entered in gesture area 102 and/or on screen 101 can be initiated on button 103 and/or can pass over button 103 as well. For purposes of the following description, gesture area 102 will be considered to include button 103 for embodiments where button 103 is touch-sensitive. In one embodiment, such functionality is implemented using techniques described in the above-cited related patent application. One skilled in the art will recognize that any number of such buttons 103, or no buttons 103, can be included, and that the number of physical buttons 103, if any, is not important to the operation of the present invention.

In one embodiment, physical button 103 can illuminate when appropriate, or can be overlaid or backlit with another LED (or other illumination technology) so as to provide additional feedback as to state and/or confirmation that user input has been detected. As described in more detail below, illumination of physical button 103 can be performed in conjunction with illumination of LEDs 201 to generate patterns indicative of various states and input conditions.

In the example of FIG. 1, gesture area 102 surrounds touch-sensitive screen 101, with no gap between screen 101 and gesture area 102. This allows the user to enter touch commands such as gestures in gesture area 102 and/or touch-sensitive screen 101, as well as to enter touch commands that cross over from gesture area 102 to touch-sensitive screen 101, and vice versa. Specific examples of such touch commands are described in related U.S. patent application Ser. No. 12/115,992, filed May 6, 2008 for "Extended Touch-Sensitive Control Area for Electronic Device", the disclosure of which is incorporated herein by reference.

One skilled in the art will recognize that, in various embodiments, gesture area 102 can be provided in any location with respect to screen 101 and need not be placed immediately below screen 101 as shown in FIG. 1. In addition, there may be a gap between gesture area 102 and screen 101, without departing from the essential characteristics of the present invention. Where a gap is present, device 100 may simply ignore the gap when interpreting touch commands that cross over from gesture area 102 to touch-sensitive screen 101, and vice versa. In some embodiments, the techniques described herein can be implemented on a device having no touch-sensitive screen 101, wherein gesture area 102 receives touch-based input.

In various embodiments, gesture area 102 can be visibly delineated on the surface of device 100, if desired, for example by an outline around gesture area 102, or by providing a different surface texture, color, and/or finish for gesture area 102 as compared with other surfaces of device 100. Such delineation is not necessary for operation of the present invention.

Figure 2A:
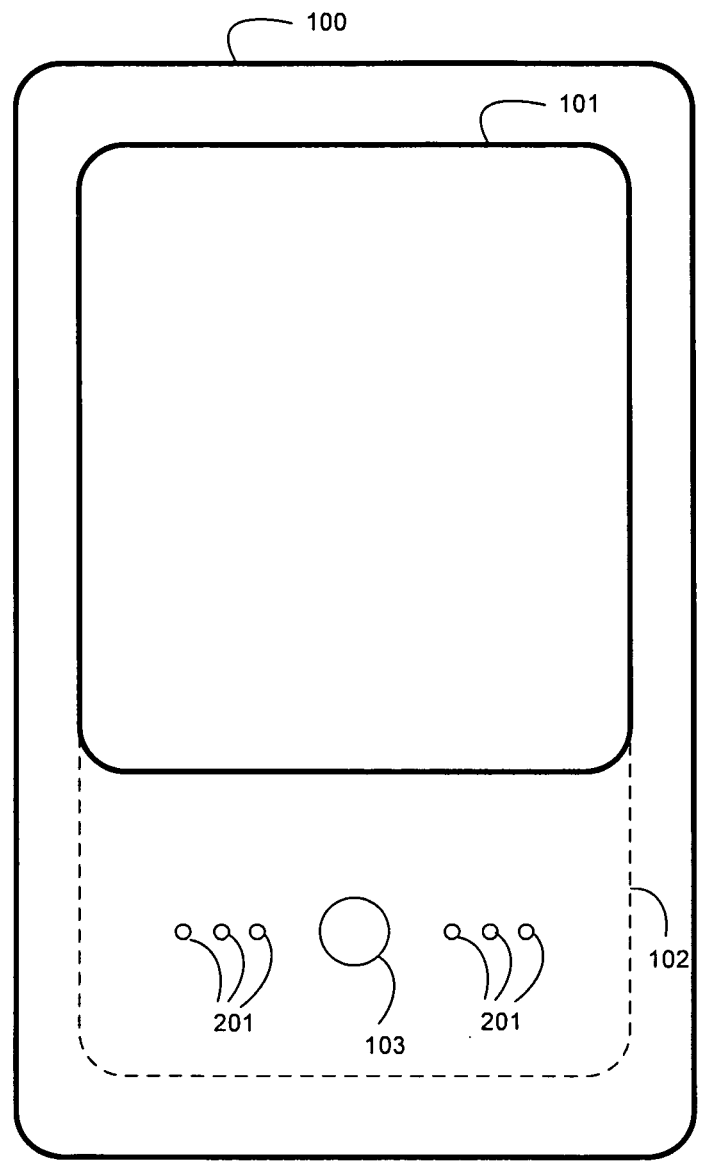
FIGS. 2A through 2D depict examples of a device having a touch-sensitive screen and a gesture area below the touch-sensitive screen, including light-emitting diodes (LEDs) for visual feedback according to one embodiment.
Figure 2B:
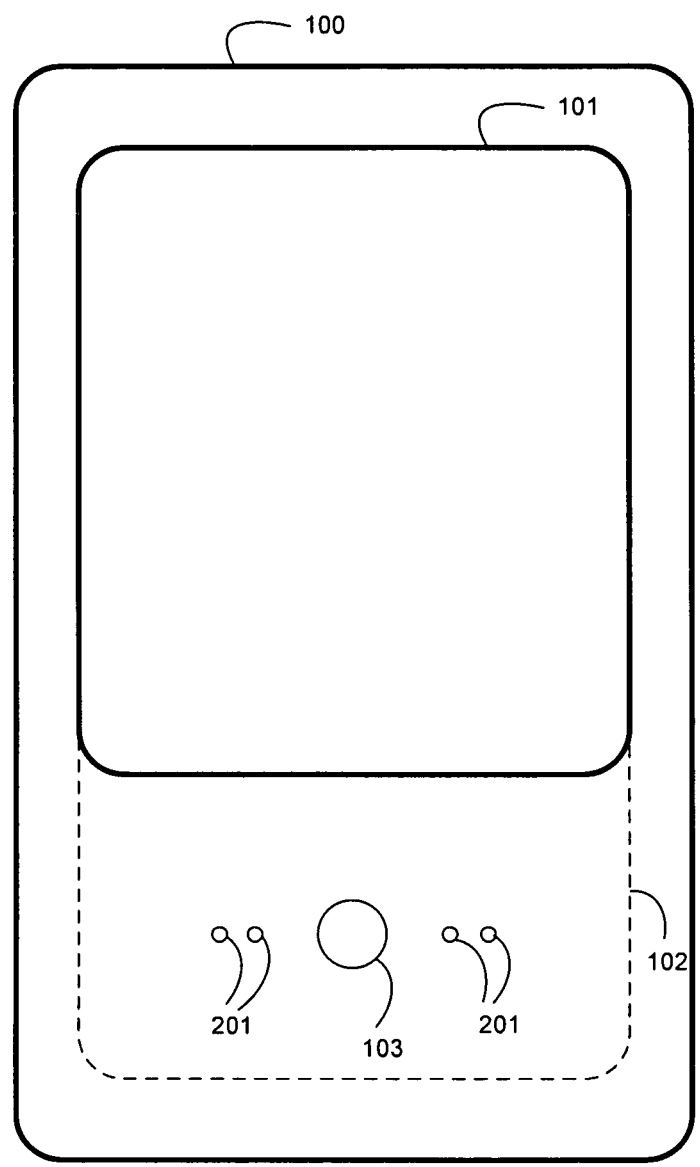
Figure 2C:
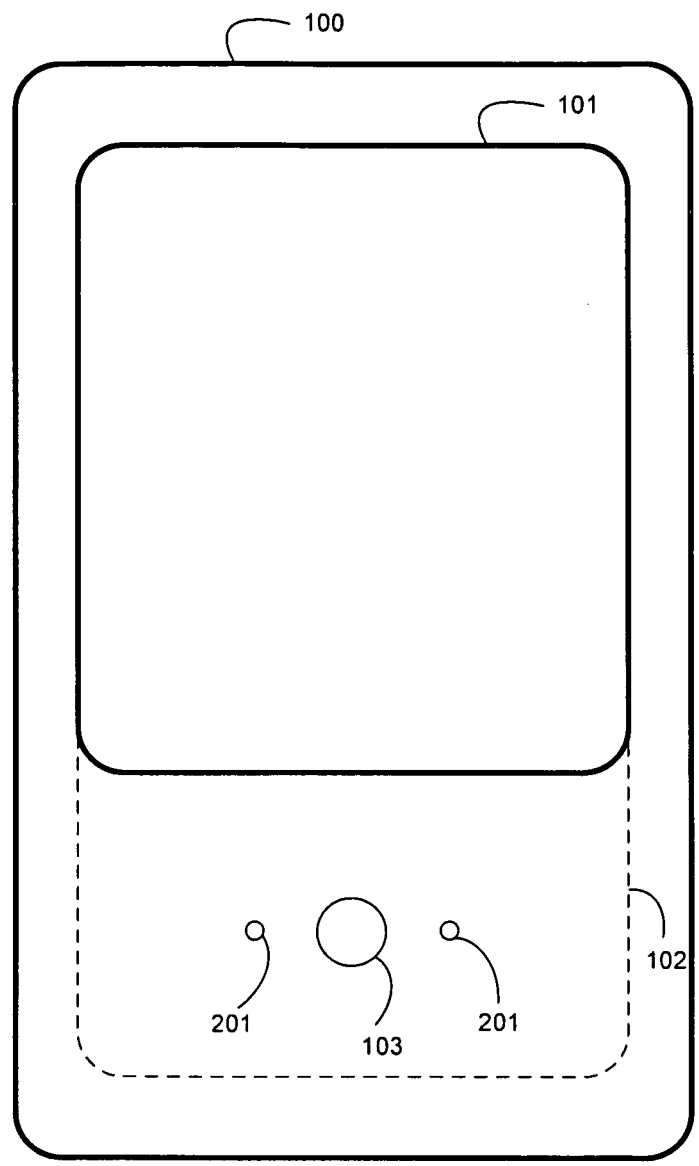
Figure 2D:
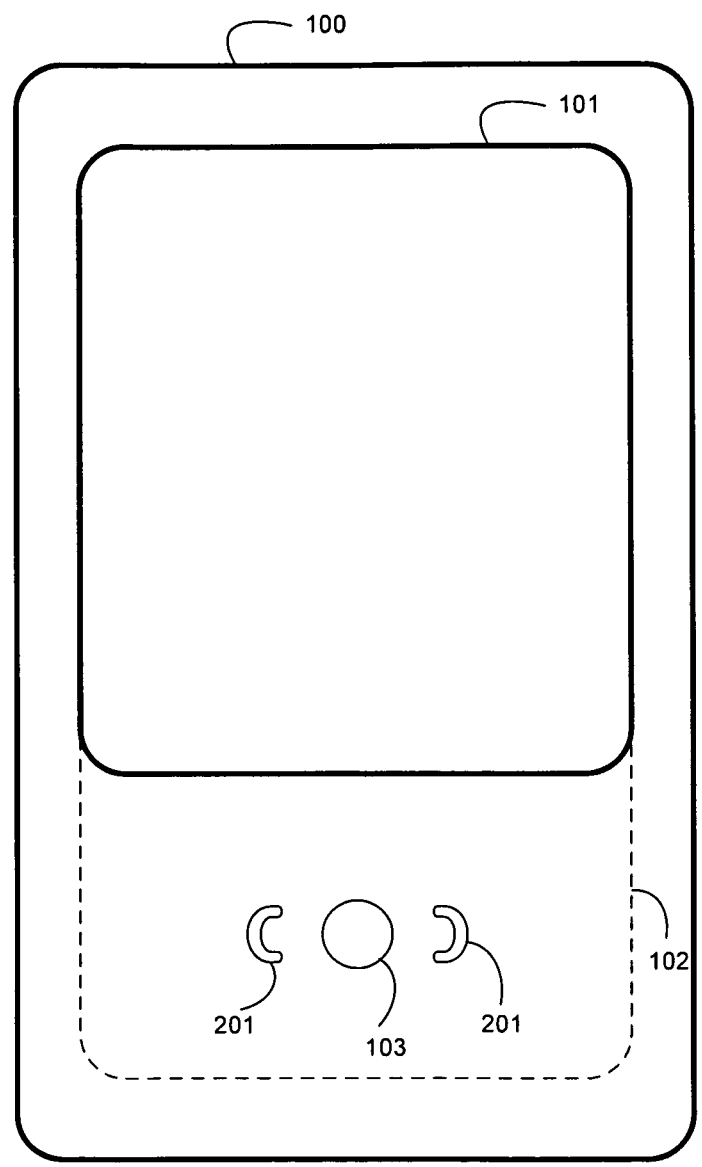
Figure 3:
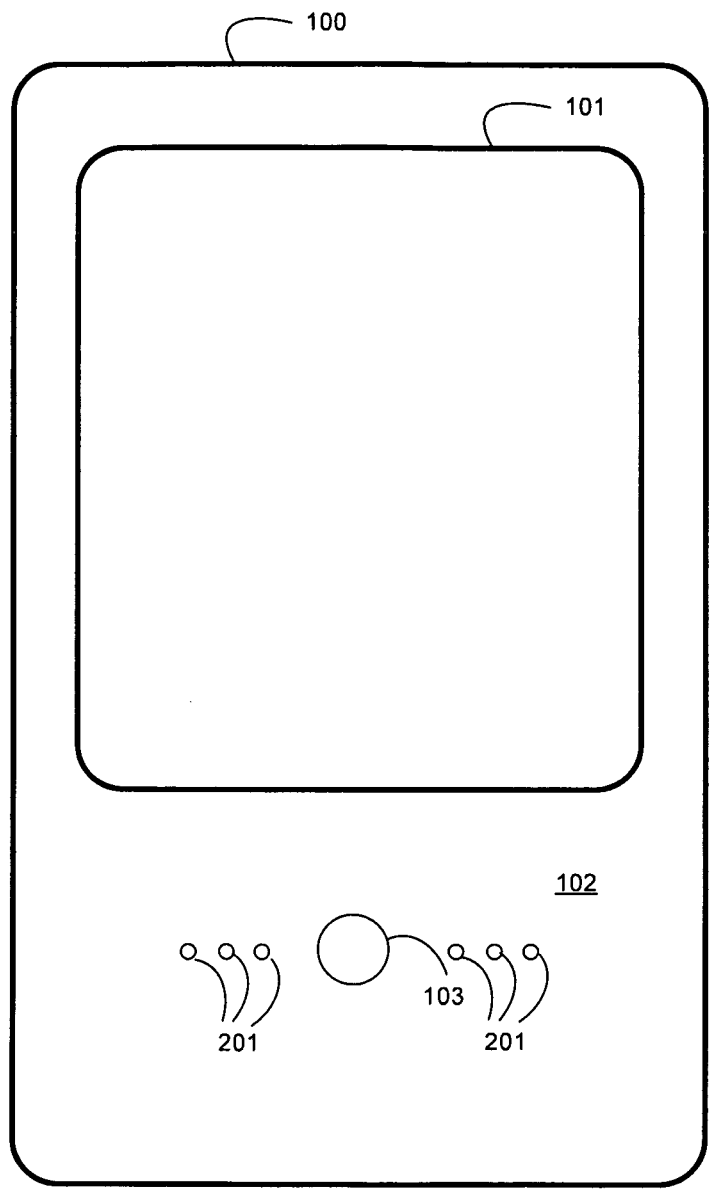
FIG. 3 depicts an example of a device having a touch-sensitive screen and a gesture area that is coextensive with the front surface of the device, including light-emitting diodes (LEDs) for visual feedback according to one embodiment.

Referring now to FIGS. 2A through 3, there are shown other examples of device 100 having various configurations.

In the examples of FIGS. 2A through 2D, gesture area 102 is located immediately below touch-sensitive screen 101, but does not surround screen 101. FIG. 2A depicts an example having six LEDs 201, arranged so that three LEDs 201 are positioned on each side of button 103. FIG. 2B depicts an example having four LEDs 201, arranged so that two LEDs 201 are positioned on each side of button 103. FIG. 2C depicts an example having two LEDs 201, arranged so that one LED 201 is positioned on each side of button 103. These configurations are merely exemplary.

FIG. 2D depicts an example having two arc-shaped LEDs 201, arranged so that one LED 201 is positioned on each side of button 103. One skilled in the art will recognize that any shape can be used for LEDs 201 and/or button 103.

Referring now to FIG. 3, there is shown another example of an embodiment of device 100, wherein gesture area 102 surrounds touch-sensitive screen 101 and extends across the entire front surface of device 100. Here, the user to enter a touch command at any location on the front surface of device 100, whether within or outside screen 101. As with the arrangements described above, the touch command can cross over from gesture area 102 to touch-sensitive screen 101, and vice versa; since gesture area 102 surrounds touch-sensitive screen 101, the cross-over can take place at any edge of screen 101, and is not limited to the bottom edge only.

In general, in various embodiments, the user can input a touch command on device 100 by any of several methods, such as:
- directly manipulate or activate an object displayed on screen 101;
- directly manipulate or activate an object displayed on screen 101, and modify the manipulation or activation by contact within gesture area 102;
- perform a gesture within gesture area 102 and/or screen 101;
- perform a gesture within gesture area 102 and/or screen 101 and indicate a target for the command by direct manipulation or activation on screen 101; or
- perform a gesture within gesture area 102 and/or screen 101, wherein the gesture inherently indicates a target for the command, by for example, starting or ending on an object displayed on screen 101.

In other embodiments, the feedback mechanism described herein can be implemented for any gesture area 102 (or touch-sensitive surface), regardless of the presence or absence of screen 101 or any other display device. One skilled in the art will recognize that the feedback mechanism described herein can be used in any context where it is helpful to provide the user with reassurance that his or her input has been received.

In one embodiment, device 100 includes a microcontroller (not shown) for controlling the operation of LEDs 201, so as to provide a mechanism for implementing any desired pattern of LED flashing, modulation and cyclical patterns without the assistance of a host CPU or other component, thereby facilitating conservation of battery power.

Visual Feedback by Illumination of Gesture Area

In one embodiment, the present invention provides a mechanism for displaying visual feedback by selective illumination of LEDs 201 or other illuminating elements within gesture area 102. This visual feedback can be used, for example, to indicate a state of device 100 and/or to acknowledge user input. Optionally, button 103 can also illuminate in conjunction with LEDs 201 to reinforce the visual feedback.

In one embodiment, certain illumination patterns are presented in order to indicate various states of device 100. For example, some patterns may be displayed when screen 101 and/or device 100 is in sleep mode, so that the user can be informed of events and/or status without having to activate or waken device 100. Examples of states that can be indicated by illumination patterns include:

When the device is in standby mode but there is no immediate attention required: No Light When the device is in standby mode and a message has arrived (such as IM, SMS, Missed call, and the like): breathe pattern, as described below in connection with FIG. 6B When the device is in active or standby mode and an alert occurs requiring the user's attention (such as low battery, system problem, and the like): ripple pattern, as described below in connection with FIG. 6A When the device is in active or standby mode and a telephone call comes in: a distinctive pattern synchronized with a ringtone or vibration alert In one embodiment, certain illumination patterns are presented to acknowledge user input, particularly when user input is provided as gestures on gesture area 102. Examples of gestures that can be acknowledged by illumination patters include:

Half-swipe, as described below in connection with FIGS. 4A through 4E

Full-swipe, as described below in connection with FIGS. 5A through 5E

Tap-and-hold, as described below in connection with FIGS. 7A and 7B

Horizontal scratch, as described below in connection with FIGS. 8A and 8B

Clockwise orbit, as described below in connection with FIGS. 9A and 9B

Thus, for example, an illumination pattern can be presented in response to input entered via gesture area 102, and/or in response to an event.

Visual Feedback to Indicate Device State

In one embodiment, illumination sequences for LEDs 201 and/or button 102 are used to indicate various states of device 100. These states can indicate an "on" condition, a "waiting for input" condition, a "sleep" condition, or any other state or condition. For example, in one embodiment a "ripple" effect is used to indicate an alert condition while device 100 is in standby (or sleep) mode, while a "breathe" effect is used to indicate an incoming message while device 100 is in standby (or sleep) mode.

Breathe

In one embodiment, the breathe ripple pattern is used to inform the user that a message has arrived.

Figure 6A:
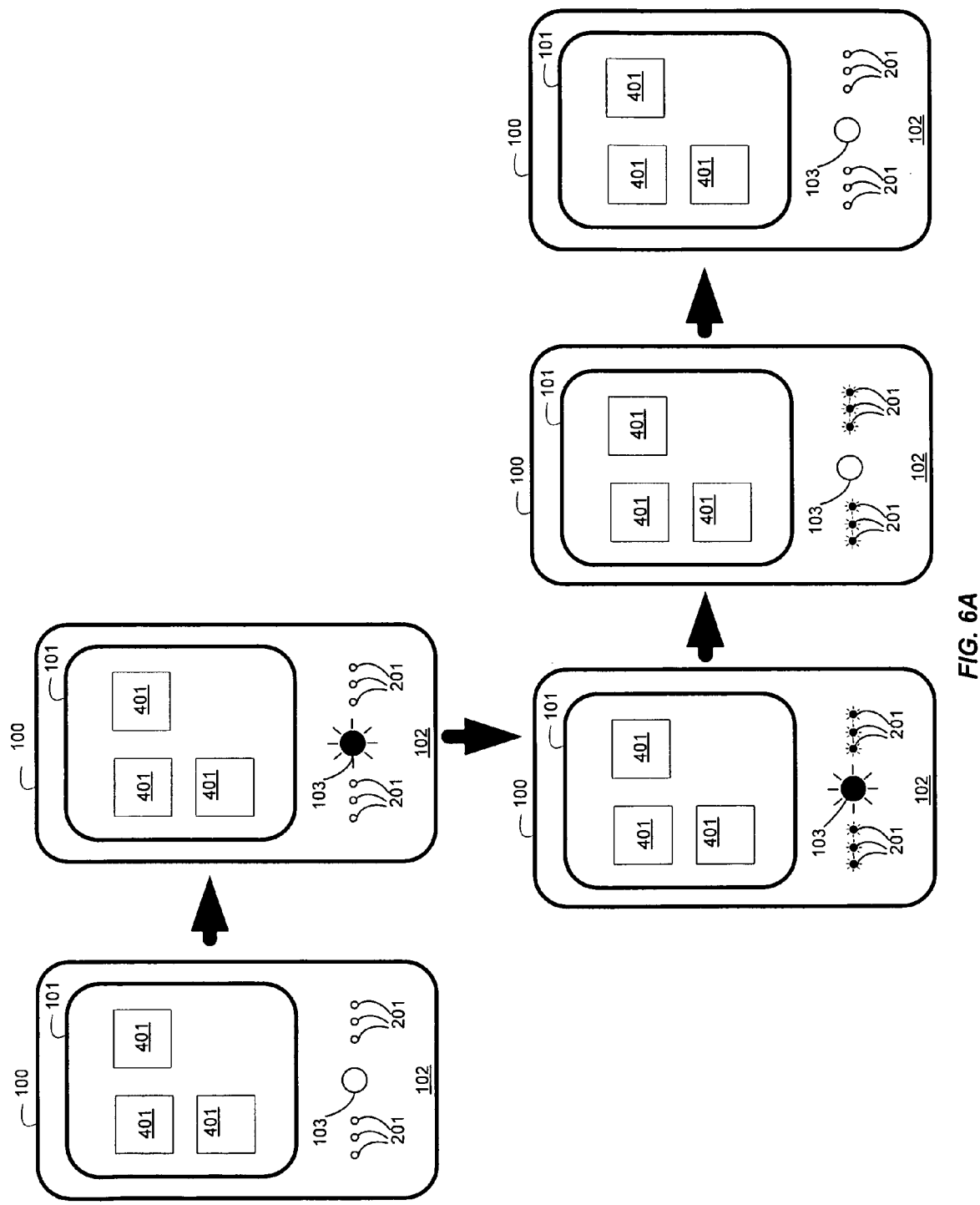
FIG. 6A depicts an example of a ripple effect to indicate a state of an electronic device, according to an embodiment of the invention.
Figure 6B:
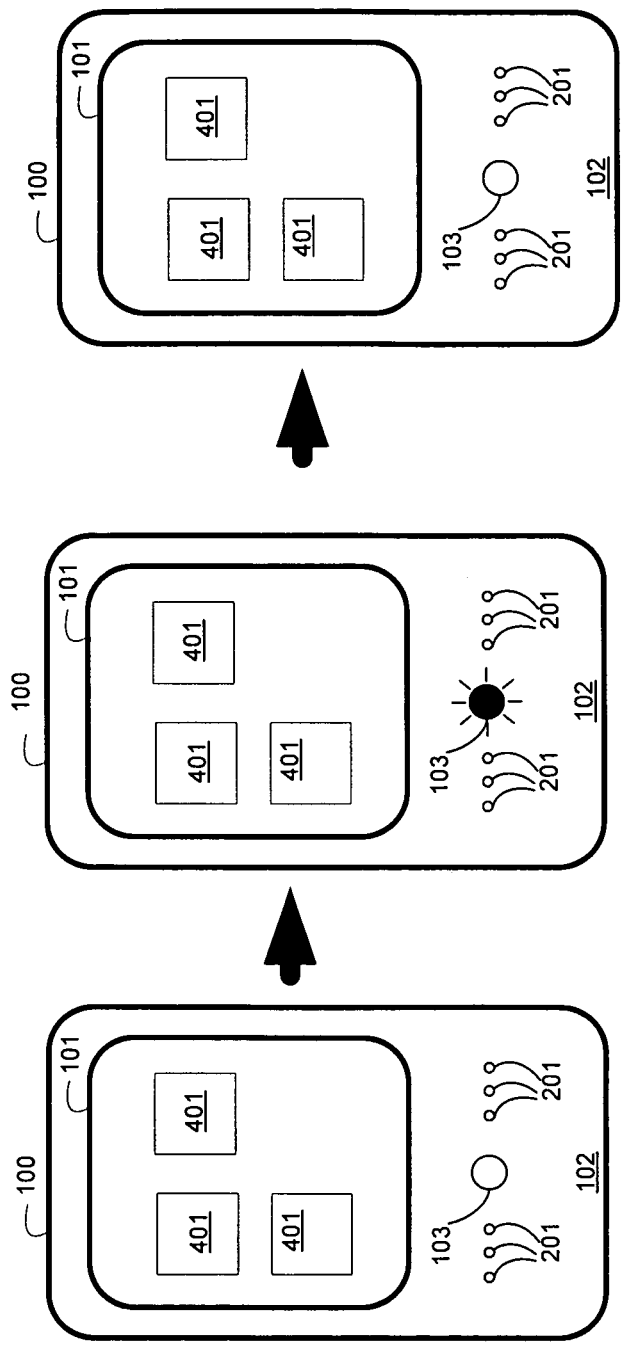
FIG. 6B depicts an example of a breathe effect to indicate a state of an electronic device, according to an embodiment of the invention.

Referring now to FIG. 6B, there is shown an example of the breathe pattern, according to an embodiment of the invention. Illumination of button 103 turns on and off, while LEDs 201 remain off. In one embodiment, button 103 turns on and off virtually instantaneously. In another embodiment, button 103 turns on and off gradually, to present a smoother transition resembling breathing.

In one embodiment, visual feedback is presented via LEDs 201 when device 100 is in a standby or sleep mode. When device 100 is in active use, pending events can be displayed on-screen in the notification banner area, either in addition to or instead of the LED 201 illumination pattern.

Accordingly, the visual feedback mechanism of the present invention provides a way for a user to check the status of device 100 without activating screen 101 or otherwise "waking up" the unit.

Ripple

In one embodiment, the ripple pattern is used to inform the user of an alert requiring the user's attention (such as low battery, system problem, and the like).

Referring now to FIG. 6A, there is shown an example of a ripple pattern to indicate a state of device 100, according to an embodiment of the invention.

Button 103 illuminates. Then, all LEDs 201 illuminate simultaneously. Illumination of button 103 then turns off, and LEDs 201 turn off subsequently.

In alternative embodiments, LEDs 201 can illuminate and turn off in a non-simultaneous manner; for example, those LEDs 201 closest to button 103 can illuminate and turn off first, with the remaining LEDs 201 illuminating and turning off in a sequence that resembles a wave of illumination emanating from the centrally located button 103.

In one embodiment, LEDs 201 turn on and off virtually instantaneously. In another embodiment, LEDs 201 turn on and off gradually, to present a smoother transition.

In some embodiments, the ripple pattern can be performed repeatedly while the state is active. Accordingly, the visual feedback mechanism of the present invention provides a way for a user to check the status of device 100 without activating screen 101 or otherwise "waking up" the unit.

Visual Feedback for User-Entered Commands

In one embodiment, input takes the form of one or more gestures representing user-entered commands, and the visual feedback provided by the system of the present invention includes illumination of one or more LEDs 201 in a pattern or arrangement that signifies the received command.

In various embodiments, different illumination sequence can be used to signify different gestures. For example, feedback for a full-swipe gesture can include a different illumination sequence than feedback for a half-swipe gesture, as described below.

In some embodiments, gesture area 102 is able to distinguish between different types of touch input, so as to perform different operations depending on the type of input received. For example, gesture area 102 may be adapted to detect different levels of force or pressure, thereby distinguishing between gestures using a light touch and those using a firmer amount of pressure. In another embodiment, duration, area of contact, degree of force, or other characteristics of touch input are assessed and interpreted so as to initiate different operations depending on the particulars of the received input. For example, in one embodiment, a light touch can be interpreted as a selection of an on-screen object, while firmer pressure can be interpreted as an activation command. In another embodiment, a touch gesture consisting of two or more points of contact (such as two fingers) can be interpreted differently than a touch gesture consisting of a single point of contact (such as one finger).

In some embodiments, the visual feedback is displayed in a manner that reflects the degree of force, pressure, or other distinctive characteristic of the input gesture. In this manner, appropriate visual feedback is provided to inform the user as to how the input action is being interpreted. For example, a higher degree of pressure or force can cause a greater degree of illumination (for example, by activation of a greater number of LEDs, or by increasing the intensity of illuminated LEDs).

The detection of different levels of force or pressure can be accomplished, for example, using techniques described in U.S. patent application Ser. No. 11/948,885, filed Nov. 30, 2007 for "Computing Device that Determines and Uses Applied Pressure from User Interaction with an Input Interface", and U.S. patent application Ser. No. 11/849,133, filed Aug. 31, 2007 for "Soft-User Interface Feature Provided in Combination with Pressable Display Surface", the disclosures of which are incorporated herein by reference.

In addition, illumination of LEDs 201 and/or other elements within gesture area 102 can provide visual feedback for non-touch input as well. For example, a user can make gestures above, next to, or proximate to gesture area 102; such gestures can be detected and interpreted according to known techniques, such as those described in U.S. Pat. No. 6,816,154, filed May 30, 2001, issued Nov. 9, 2004, for "Optical Sensor-Based User Interface for a Portable Device", U.S. Pat. No. 6,992,659, filed May 22, 2001, issued Jan. 31, 2006, for "High Transparency Integrated Enclosure Touch Screen Assembly for a Portable Hand Held Device", and U.S. Pat. No. 7,006,080 filed Feb. 19, 2002, issued Feb. 28, 2006, for "Display System", the disclosures of which are incorporated herein.

Referring now to FIGS. 4A through 9B, there are shown various examples of visual feedback to indicate detection of various gestures. One skilled in the art will recognize that these examples are intended to illustrate the principles of the present invention, but are not intended to limit the scope of the invention. The examples depict illumination sequences for a configuration including six LEDs 201 arranged so that a row of three LEDs 201 appears on each side of button 103. One skilled in the art will recognize that, for other configurations of LEDs or other illumination sources, other illumination sequences may be implemented without departing from the essential characteristics of the invention.

Half-Swipe

Referring now to FIG. 4A, there is shown an example of a half-swipe gesture 402A that can be entered according to an embodiment of the invention. This gesture 402A is indicated by an arrow in FIG. 4A, showing that the user has swiped across a portion of gesture area 102 without crossing over physical button 103. In one embodiment, such a gesture 402A returns the user to a previous view within an application. The user can perform the half-swipe left gesture 402A anywhere within gesture area 102; the associated function does not require identification of any particular target on screen 101.

Referring now to FIG. 4B, there is shown an example of visual feedback for a half-swipe gesture, according to an embodiment of the invention. The example of FIG. 4B depicts an illumination sequence for LEDs 201, wherein three of the six LEDs 201 momentarily illuminate and then turn off again. The other three LEDs 201 remain off during the illumination sequence, thus emphasizing that the gesture is a half-swipe rather than a full-swipe.

Figure 4C:
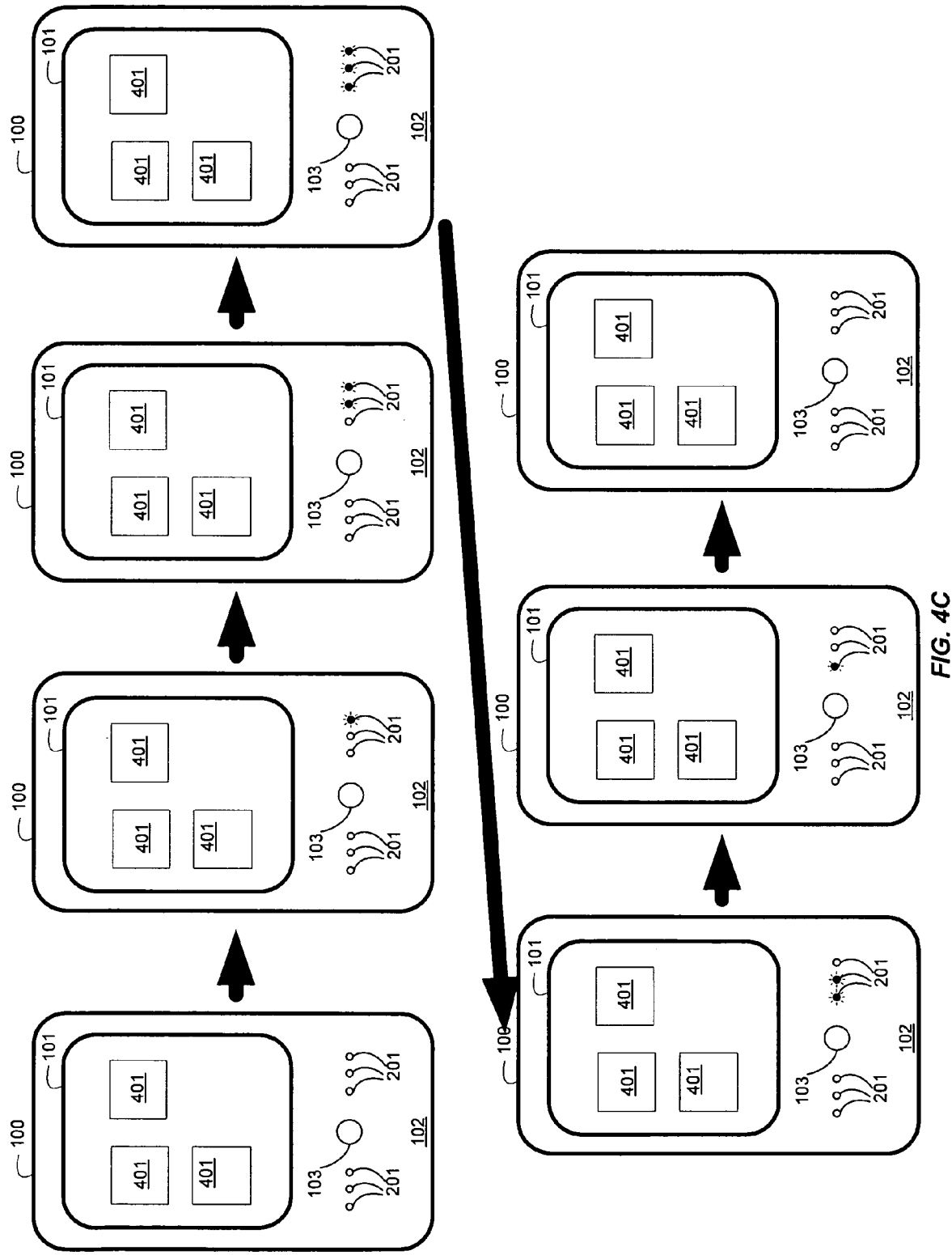

Referring now to FIG. 4C, there is shown an example of visual feedback for a half-swipe gesture, according to another embodiment of the invention. In the illumination sequence of FIG. 4C, three of the six LEDs 201 illuminate in a sequence mimicking the direction of the half-swipe gesture. Thus, as shown, the three LEDs 201 to the right of button 102 illuminate in a right-to-left sequence. Once all three LEDs 201 to the right of button 102 have illuminated, they turn off in the same right-to-left sequence. The other three LEDs 201 to the left of button 102 remain off during the illumination sequence, thus emphasizing that the gesture is a half-swipe rather than a full-swipe. One skilled in the art will recognize that other timing arrangements and sequences can be implemented.

In some embodiments, button 103 is capable of being illuminated (and/or overlaid with an illuminating element) to provide further feedback. For example, button 103 may be constructed of a transparent material with one or more embedded LED(s) within. In such embodiments, button 103 can be illuminated in conjunction with LEDs 201 as part of the illumination sequence. In embodiments where button 103 includes more than one embedded LED, the embedded LEDs may operate in concert with one another, or they may operate separately, depending on the nature of the visual feedback desired.

Figure 4D:
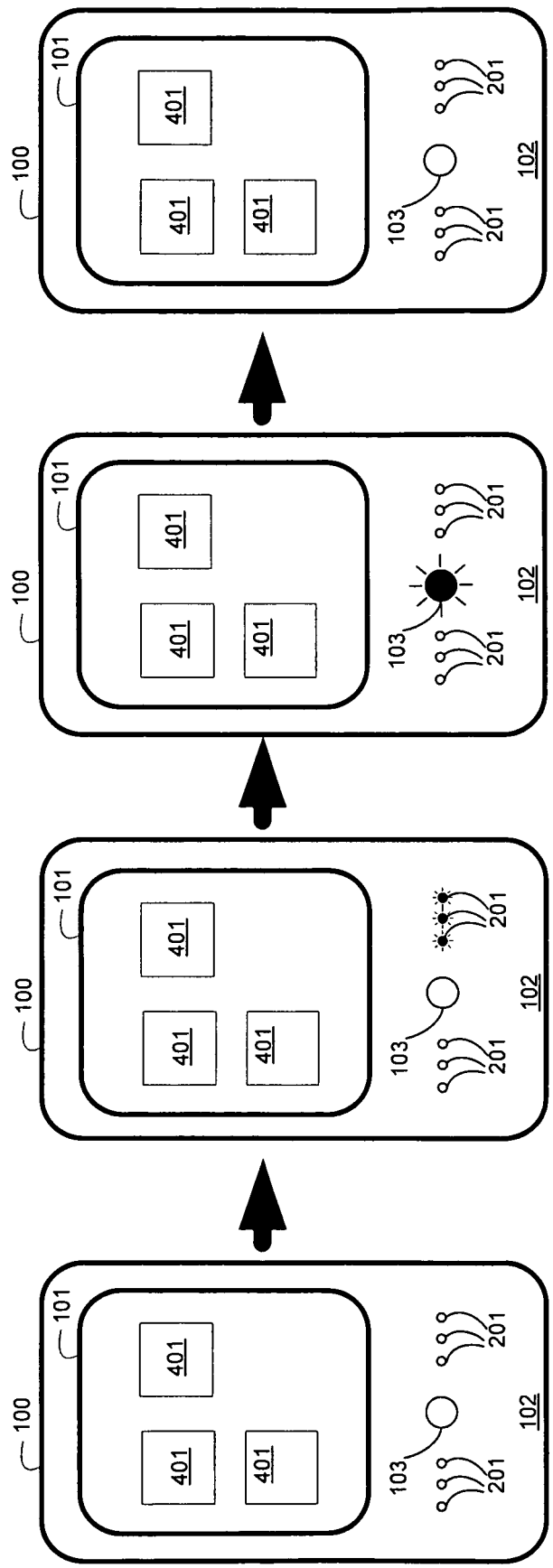

Referring now to FIG. 4D, there is shown an example of visual feedback for a half-swipe gesture, according to an embodiment of the invention where button 103 is illuminated as part of an illumination sequence. In the illumination sequence of FIG. 4D, three of the six LEDs 201 momentarily illuminate and then turn off again. As LEDs 201 turn off, button 103 illuminates. Then button 103 turns off. The other three LEDs 201 remain off during the illumination sequence, thus emphasizing that the gesture is a half-swipe rather than a full-swipe. In other variations, button 103 can illuminate before LEDs 201 illuminate, so that the sequence is reversed.

Referring now to FIG. 4E, there is shown an example of visual feedback for a half-swipe gesture, according to another embodiment of the invention where button 103 is illuminated as part of an illumination sequence. In the illumination sequence of FIG. 4E, three of the six LEDs 201 illuminate in a sequence mimicking the direction of the half-swipe gesture. Thus, as shown, the three LEDs 201 to the right of button 102 illuminate in a right-to-left sequence. Once all three LEDs 201 to the right of button 102 have illuminated, they turn off in the same right-to-left sequence. Button 103 illuminates while some of LEDs 201 remain illuminated. After all LEDs 201 have been turned off, the illumination of button 103 is turned off as well. The other three LEDs 201 to the left of button 102 remain off during the illumination sequence, thus emphasizing that the gesture is a half-swipe rather than a full-swipe.

Various alternatives are possible. For example, button 102 can be illuminated before any of LEDs 201 are turned off, rather than after one or more LEDs 201 has been turned off.

In one embodiment, the particular selection of which LEDs 201 to illuminate depends upon where the gesture was entered within gesture area 102. For example, a half-swipe gesture entered on the right-hand side of gesture area 102 would cause the right-most LEDs 201 to illuminate, while a half-swipe gesture entered on the left-hand side of gesture area 102 would cause the left-most LEDs 201 to illuminate.

In one embodiment, the illumination sequence depends upon the direction of the gesture. Thus, a right-to-left gesture causes LEDs 201 to illuminate in a right-to-left sequence, as described above, while a left-to-right gesture causes LEDs 201 to illuminate in a left-to-right sequence.

Full-Swipe

Referring now to FIG. 5A, there is shown an example of a full-swipe gesture 402B that can be entered according to an embodiment of the invention. This gesture 102A is indicated by an arrow in FIG. 5A extending across button 103, showing that the user has swiped directly over physical button 103. In one embodiment, such a gesture 402B returns the user to a previously viewed application. The user can perform full-swipe gesture 402B anywhere within gesture area 102; the associated function does not require identification of any particular target on screen 101.

Referring now to FIG. 5B, there is shown an example of visual feedback for a full-swipe gesture, according to an embodiment of the invention. The example of FIG. 5B depicts an illumination sequence for LEDs 201, wherein all six LEDs 201 illuminate in a sequence: specifically, the three LEDs 201 on one side of button 103 illuminate first, followed by the three LEDs 201 on the other side of button 103. In the displayed embodiment, the first set of LEDs 201 turns off as the second set illuminates. After the second set of LEDs 201 has illuminated, all LEDs are turned off. By using all six LEDs 201, the illumination sequence emphasizes that the gesture is a full-swipe. One skilled in the art will recognize that other timing arrangements and sequences can be implemented.

Figure 5C:
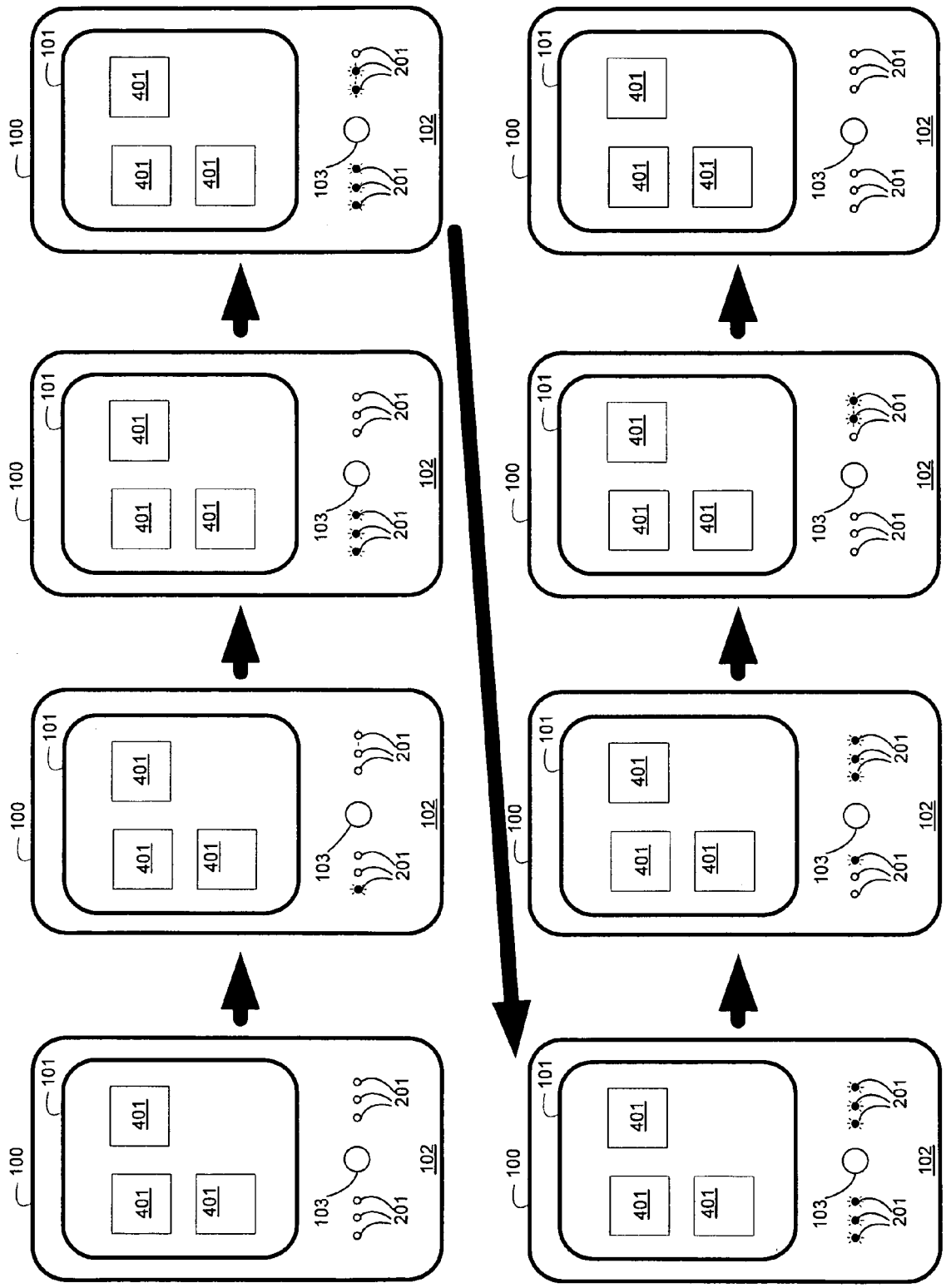

Referring now to FIG. 5C, there is shown an example of visual feedback for a full-swipe gesture, according to another embodiment of the invention. In the illumination sequence of FIG. 5C, the six LEDs 201 illuminate in a sequence mimicking the direction of the full-swipe gesture. Thus, as shown, the six LEDs 201 illuminate in a left-to-right sequence. Once all six LEDs 201 have illuminated, they turn off in the same left-to-right sequence. One skilled in the art will recognize that other timing arrangements and sequences can be implemented; for example, some LEDs 201 may start turning off before all LEDs 201 have been illuminated.

Figure 5D:
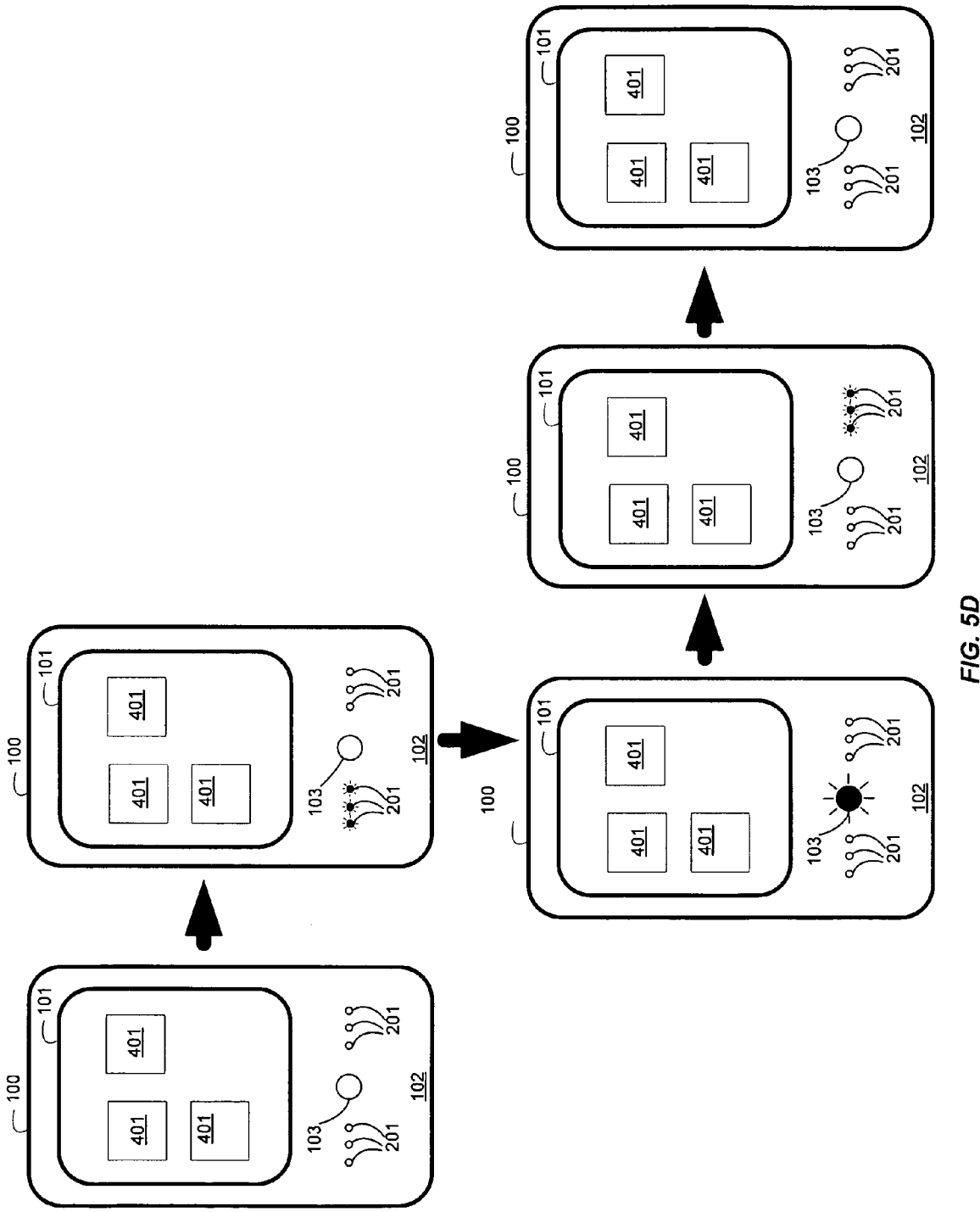

Referring now to FIG. 5D, there is shown an example of visual feedback for a full-swipe gesture, according to an embodiment of the invention where button 103 is illuminated as part of an illumination sequence. In the illumination sequence of FIG. 5D, the left-most three of the six LEDs 201 momentarily illuminate and then turn off again. As the left-most three LEDs 201 turn off, button 103 illuminates. Then, as button 103 turns off, the right-most three LEDs 201 illuminate and then turn off again. In one embodiment, for a right-to-left full-swipe gesture, this sequence would be reversed.

Figure 5E:
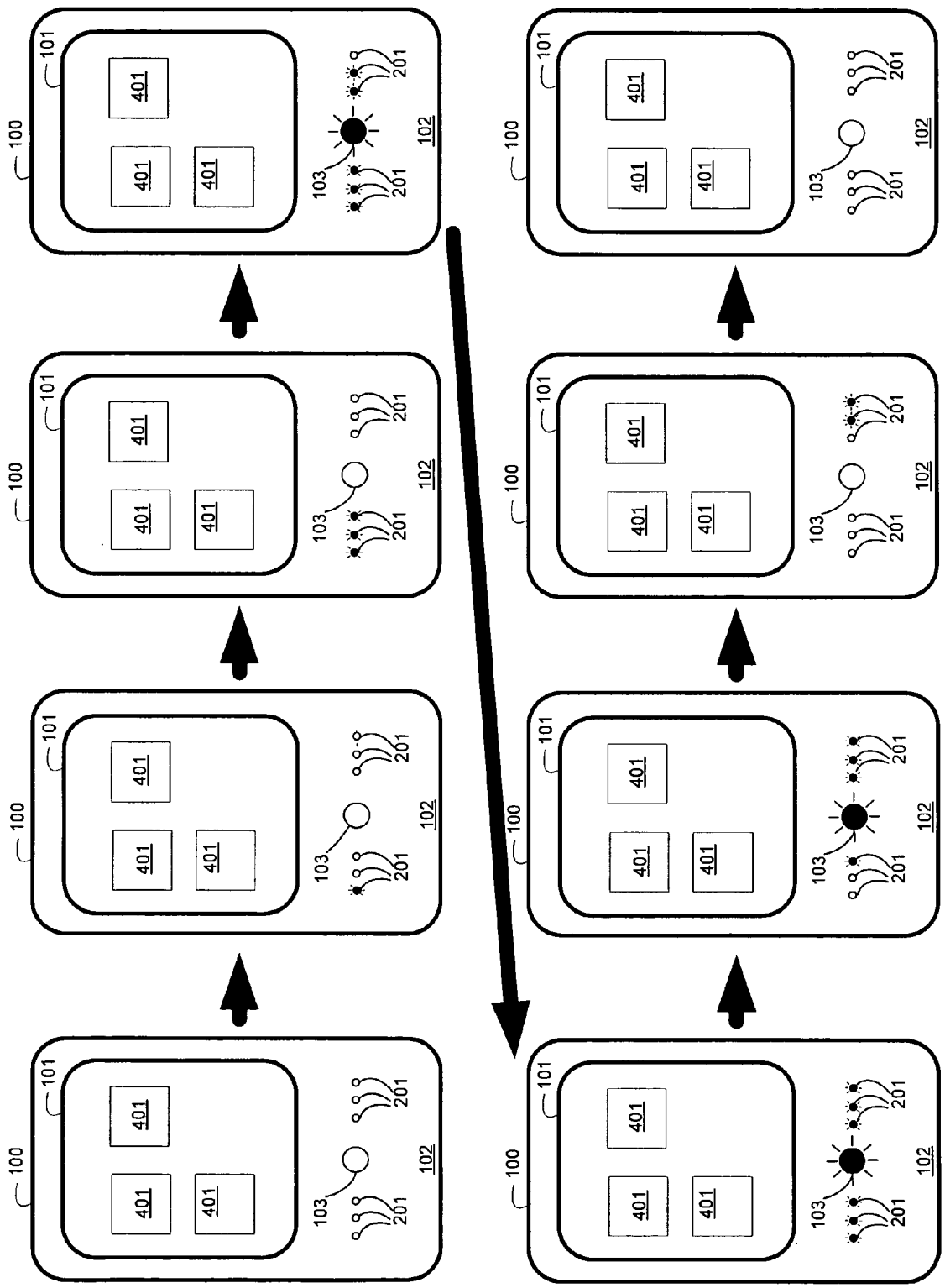

Referring now to FIG. 5E, there is shown an example of visual feedback for a full-swipe gesture, according to another embodiment of the invention where button 103 is illuminated as part of an illumination sequence. In the illumination sequence of FIG. 5E, three of the six LEDs 201 illuminate in a sequence mimicking the direction of the full-swipe gesture. Thus, as shown, the three LEDs 201 to the left of button 102 illuminate in a left-to-right sequence. Once all three LEDs 201 to the left of button 102 have illuminated, button 103 illuminates. The left-most LEDs 201 remain illuminated. Then, the three LEDs 201 to the right of button 102 illuminate in a left-to-right sequence, until all LEDs 201 and button 102 are all illuminated. LEDs 201 and button 102 then turn off in the same sequence, with the three LEDs 201 to the left of button 102 being turned off first, followed by button 102 illumination, followed by the three LEDs 201 to the right of button 102 in a left-to-right sequence.

Two-Part Command: Tap-and-Hold

In one embodiment, device 100 recognizes commands that are activated by combining gestures 402 in gesture area 102 within input on touch-sensitive screen 101. Such commands may be activated by, for example:

Beginning a gesture in gesture area 102 and completing it on touch-sensitive screen 101;

Beginning a gesture on touch-sensitive screen 101 and completing it in gesture area 102;

Performing a multi-part gesture that involves at least one contact with gesture area 102 followed by at least one contact with touch-sensitive screen 101;

Performing a multi-part gesture that involves at least one contact with touch-sensitive screen 101 followed by at least one contact with gesture area 102; and Performing a gesture that involves substantially simultaneous or contemporaneous contact with touch-sensitive screen 101 and gesture area 102 (for example, a component of the gesture is performed on screen 101 while another component of the gesture is performed on gesture area 102).

One example of such a gesture 402 is to perform a gesture on screen 101 while also touching gesture area 102. Thus, the contact with gesture area 102 serves as a modifier for the gesture 402 being performed on screen 101.

Another example is to perform a gesture in gesture area 102, while also touching an object 401 on screen 101. Thus, the contact with the object 401 serves as a modifier for the gesture 402 being performed in gesture area 102.

In some embodiments, some or all of the LEDs 201 illuminate while a user is in the process of performing a first part of a command in gesture area 102. In this manner, when a user begins a gesture in gesture area 102, he or she is presented with positive feedback that the gesture is recognized; this feedback can also inform the user that a second part of the command is awaited.

Figure 7A:
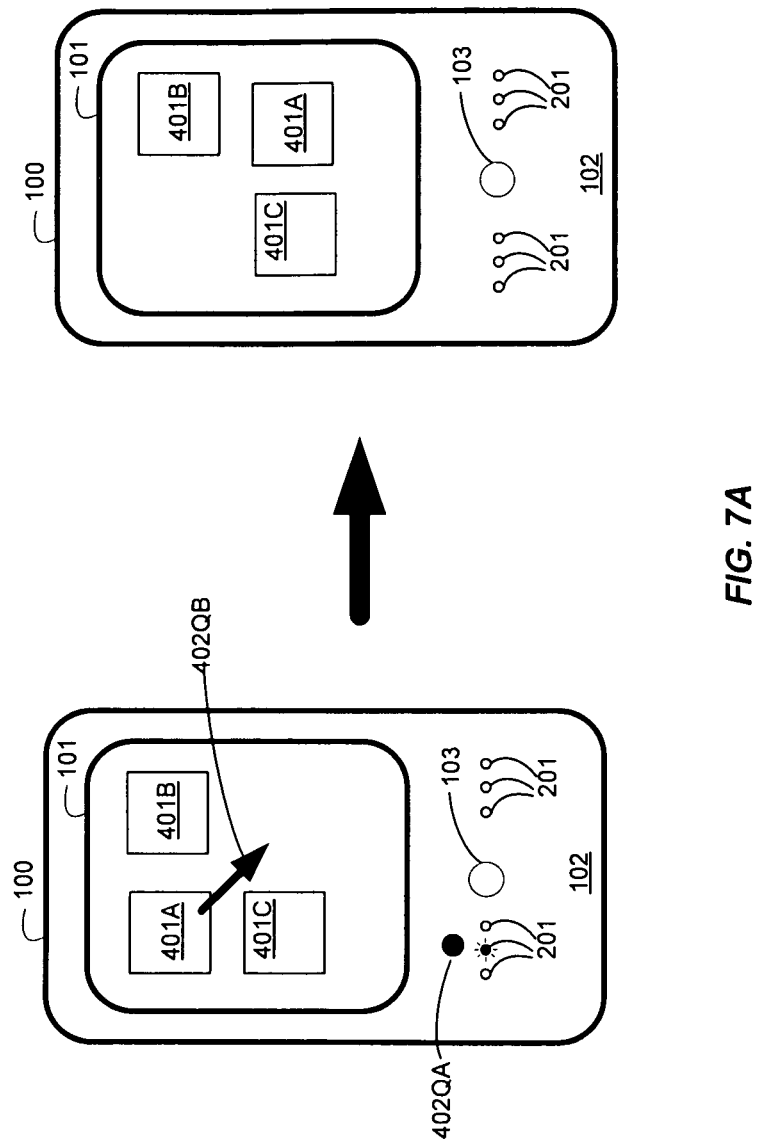
FIGS. 7A and 7B depict examples of visual feedback to indicate detection of an initial tap-and-hold portion of a two-part command, according to an embodiment of the invention.
Figure 7B:
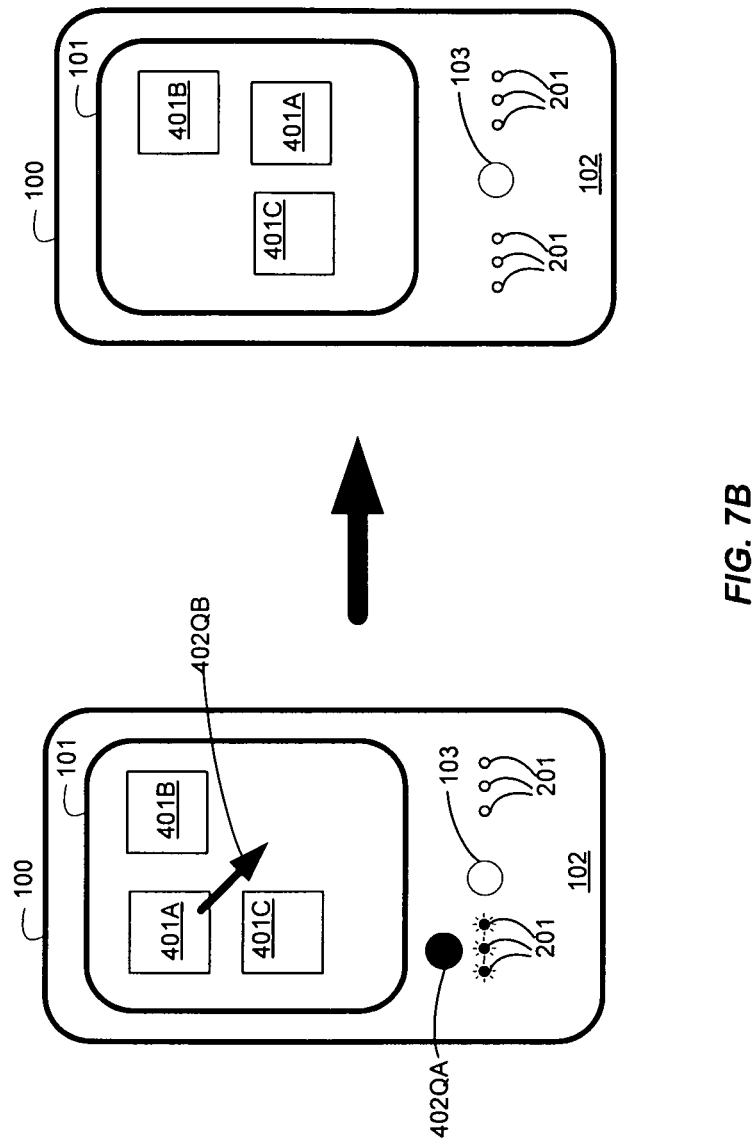

Referring now to FIG. 7A, there is shown an example of visual feedback to indicate detection of an initial tap-and-hold portion of a two-part command, according to an embodiment of the invention. The user holds one finger at location 402QA in gesture area 102; while the finger is held at location 402QA, the user drags another finger on screen 101, performing gesture 402QB. This causes object 401A, (or a cursor or other on-screen item) to be dragged along with the second finger. When the second finger is removed from screen 101, object 401A or the other on-screen item is dropped, as shown in the right side of FIG. 7. Thus, the finger in gesture area 102 acts as a modifier, obviating the need for the user to hold the second finger on the on-screen item in order to initiate a drag operation. In other embodiments, holding a finger in gesture area 102 while performing a gesture on screen 101 causes the screen gesture to be modified from its normal function in some other way.

As shown in FIG. 7A, an LED 201 is illuminated while the user holds his or her finger at location 402QA, to indicate that the input has been received and that additional input (such as gesture 402QB) is awaited. In one embodiment, any number of LEDs 201 can be so illuminated. In one embodiment, device 100 illuminates those LEDs 201 that are located at or near the point of contact.

As discussed above, in some embodiments, gesture area 102 is able to detect different degrees of pressure, force, and/or duration. Appropriate visual feedback is provided to indicate the detected degree of pressure, force, and/or duration. Referring now to FIG. 7B, there is shown an example of visual feedback for a tap-and-hold input operation performed with greater force than that of FIG. 7A. Accordingly, rather than illuminating a single LED 201, three LEDs 201 are illuminated. Thus, the higher degree of pressure, force, and/or duration is indicated by a greater number of LEDs 201 being illuminated. In other embodiments, other configurations can be used.

Once the command is completed, the LEDs 201 are turned off.

Two-Part Command: Horizontal Scratch

Figure 8A:
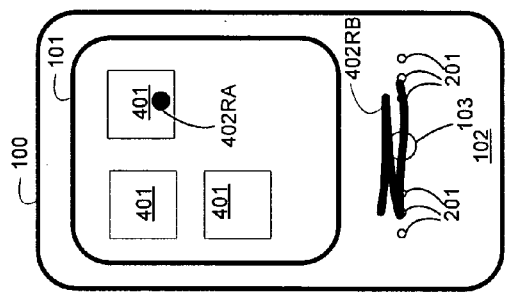
FIGS. 8A and 8B depict an example of visual feedback to indicate detection of a horizontal scratch portion of a two-part command, according to an embodiment of the invention.

Referring now to FIG. 8A, there is shown another example of a gesture sequence having gesture components that can be performed sequentially or simultaneously. In the example of FIG. 8A, the user performs a horizontal scratch gesture 402RB within gesture area 102 and a tap gesture 402RA on an on-screen object 401. In one embodiment, gesture 402RB indicates a delete command and gesture 402RA identifies the target 401 of the command. In one embodiment, the user can perform the horizontal scratch gesture 402RB anywhere within gesture area 102; in another embodiment, the gesture may have different meaning depending on where it is performed. In one embodiment, the sequence can be performed in either order, so that the target 401 can be specified by gesture 402RA either before or after the scratch gesture 402RB is performed. In yet another embodiment, the gestures 402RA and 402RB can be performed contemporaneously (for example, the user might hold a finger at location 402RA while performing scratch gesture 402RB).

Figure 8B:
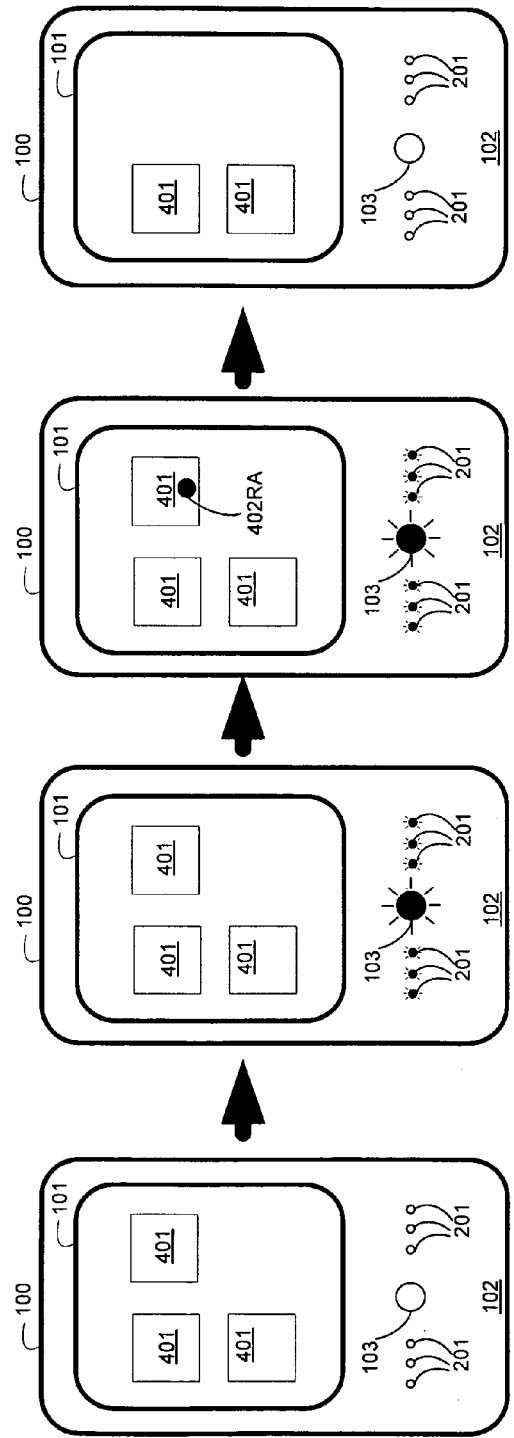

Referring also to FIG. 8B, there is shown an example of visual feedback to indicate detection of a horizontal scratch portion of a two-part command, according to an embodiment of the invention. Once the user has entered horizontal scratch gesture 402RB, LEDs 201 and button 103 illuminate to indicate that the input has been received and that additional input (such as gesture 402RB) is awaited. In one embodiment, any number of LEDs 201 can be so illuminated. In one embodiment, device 100 illuminates those LEDs 201 that are located at or near the point of contact.

Once the command is completed, the LEDs 201 are turned off. Two-part command: orbit Referring now to FIG. 9A, there is shown an example of a clockwise orbit gesture 402S starting within gesture area 102 and ending on an on-screen object 401. Thus, on-screen object 401 is identified as the target of the command. In one embodiment, such a gesture 402S can perform a scale or zoom object function. In one embodiment, the user can begin the orbit gesture 402S anywhere within gesture area 102; in another embodiment, the gesture may have different meaning depending on whether it circles button 103 or is performed in some other part of gesture area 102. In one embodiment, an orbit gesture may have a different meaning if performed in a counterclockwise direction.

Referring also to FIG. 9B, there is shown an example of visual feedback to indicate detection of a clockwise orbit gesture 402S, according to an embodiment of the invention. Once the user has begun to enter clockwise orbit gesture 402S, some of LEDs 201 and button 103 illuminate to indicate that the input has been received and that additional input (such as the completion of clockwise orbit gesture 402S on an on-screen object 401) is awaited. In one embodiment, any number of LEDs 201 can be so illuminated. In one embodiment, device 100 illuminates those LEDs 201 that are located at or near the point where gesture 402S is started.

Method

Figure 10:
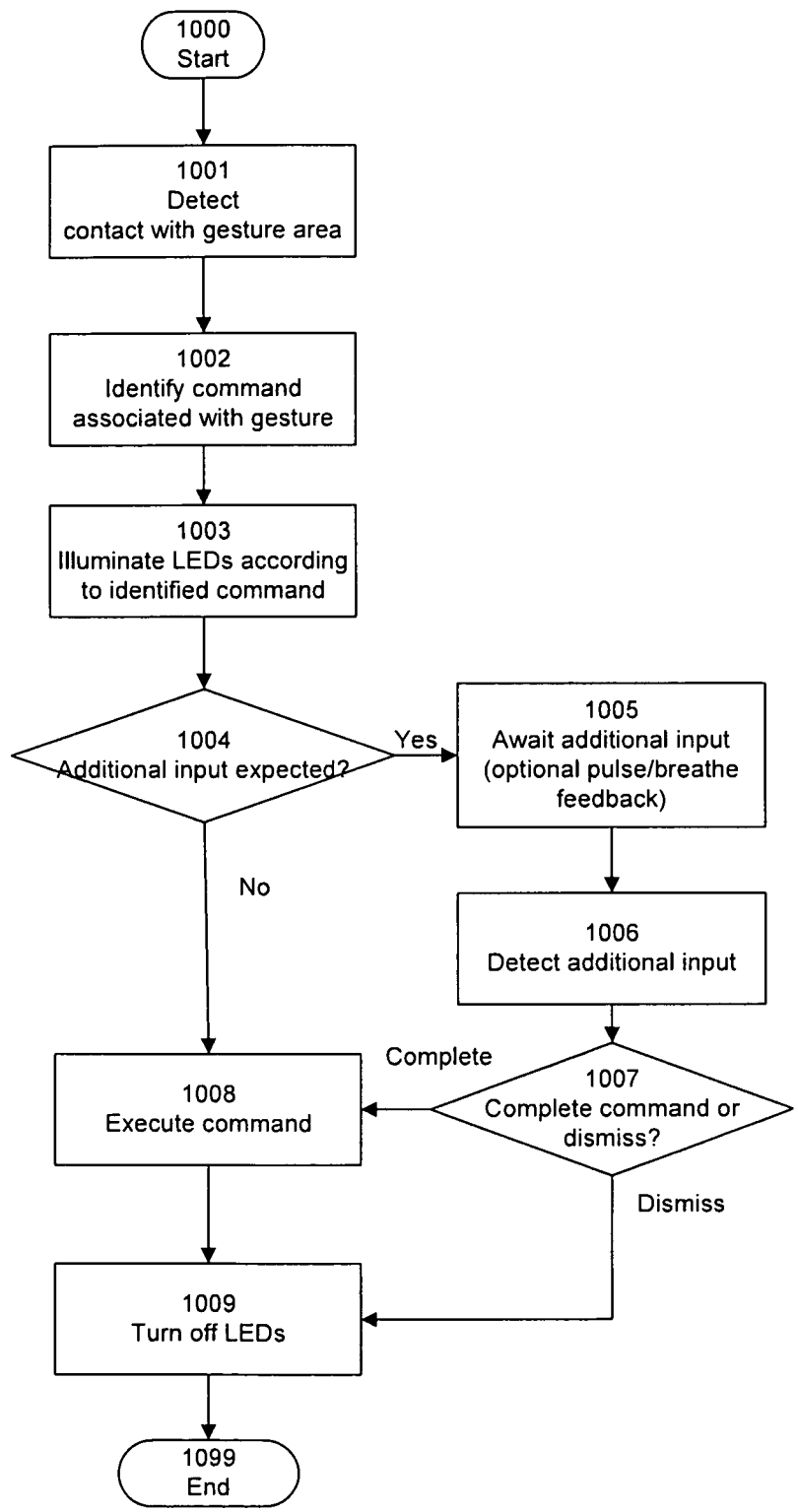
FIG. 10 is a flowchart depicting a method of providing visual feedback according to one embodiment of the present invention.

Referring now to FIG. 10, there is shown a flowchart depicting a method of providing visual feedback according to one embodiment of the present invention.

In one embodiment, device 100 detects 1001 contact with gesture area 102. In alternative embodiments, the method of the present invention can include any detection of a gesture, either by contact, proximity, or any other mechanism.

A command associated with the detected gesture is identified 1002. Device 100 then illuminates the appropriate LEDs 201 (optionally including illumination of button 103 and/or other components) according to the identified command. In this manner, the user is given feedback appropriate to the input he or she has provided.

Device 100 then determines 1004 whether additional input is expected, depending on the nature of the input. If additional input is expected, device 100 awaits the input. Optionally, while waiting for additional input, device 100 can illuminate appropriate LEDs 201 to indicate a wait state. The additional input is detected 1006. If the additional input indicates 1007 that the command should be completed, the command is executed 1008 and LEDs 201 are turned off. If the additional input indicates 1007 that the command should be dismissed, LEDs 201 are turned off without executing the command.

If, in 1004, it is determined that no additional input is expected, the command is executed 1008 and LEDs 201 are turned off 1009.

Illuminable Elements

In one embodiment, LEDs 201 are used as illuminable elements to implement the above-described illumination patterns. One skilled in the art will recognize that any other illuminable elements can be used. Accordingly, the following described characteristics of LEDs 201 that can be used in one embodiment are merely intended to be exemplary.

In one embodiment, the illumination patterns are specified as linearly interpolated segments having predetermined length (such as 0 to 60 seconds), with each segment having a specified power level selected from a plurality of available power levels. In one embodiment, 16 power levels are available. Power levels can be specified, for example in terms of a percentage of peak available power.

In one embodiment, changes from one illumination level to another are performed smoothly, so that a transition from one level to another takes place over some period of time. In one embodiment, in order to provide a smooth effect, transitions in illumination levels are performed at a minimum 100 Hz.

If a transition between two brightness levels occurs over a sufficiently long interval, staircasing (time aliasing/step quantization) can be seen due to a limited number of power levels available. This may cause the user to perceive discrete brightness changes instead of a smooth change. In one embodiment, dithering is used, whereby the various intensity steps are mixed with one another to create a smooth dissolve.

In order to further improve the smoothness with which light intensity changes, in one embodiment each segment indicating a lighting level is measured in increments of 50 microseconds. In general, LED 201 intensity is interpolated over the interval from the previous intensity level to the new intensity level.

In one embodiment, the present invention avoids load on the host CPU or other components, by providing a separate microcontroller (not shown) for controlling LEDs 201 while device 100 is in sleep mode. The microcontroller implements the illumination patterns described herein without waking the host CPU.

In one embodiment, illumination patterns are specified as follows. For a given illumination pattern, the intensity of each LED 201 varies according to a timeline having a number of segments. For each segment, a time period and an intensity level are specified. The microcontroller implements the illumination pattern by illuminating each LED 201 according to the specified intensity level for each specified time period in the pattern. If appropriate, the pattern repeats. In some embodiments, the microcontroller causes the LED 201 to gradually move from one brightness level to the next. This may be accomplished, for example, using a fixed-point interpolation algorithm or the use of an algorithm (such as the well-known Bresenham's line algorithm) to establish intermediate values between the start and end points.

In one embodiment, the timelines are also applied to an internal vibrational motor (not shown) to provide vibration feedback that is timed with the visual feedback.

In one embodiment a timeline for a left-to-right half-swipe pattern for a device having two LEDs 201 and button 103 that can be illuminated might be specified as follows:

TABLE 1

Left-to-Right Half-Swipe Timeline

| Segment number | Time period | Illumination | | |
| --- | --- | --- | --- | --- |
| | | Left side LED(s) 201 | Button 103 | Right side LED(s) 201 |
| 0 | 0 ms | 0% | 0% | 0% |
| 1 | 150 ms | 25% | 0% | 0% |
| 2 | 150 ms | 100% | 25% | 0% |
| 3 | 150 ms | 50% | 100% | 0% |
| 4 | 150 ms | 25% | 50% | 0% |

TABLE 1-continued

Left-to-Right Half-Swipe Timeline

| Segment number | Time period | Illumination | | |
| --- | --- | --- | --- | --- |
| | | Left side LED(s) 201 | Button 103 | Right side LED(s) 201 |
| 5 | 150 ms | 15% | 25% | 0% |
| 6 | 150 ms | 10% | 15% | 0% |
| 7 | 150 ms | 5% | 10% | 0% |
| 8 | 150 ms | 0% | 5% | 0% |
| 9 | 150 ms | 0% | 0% | 0% |

Figure 11:
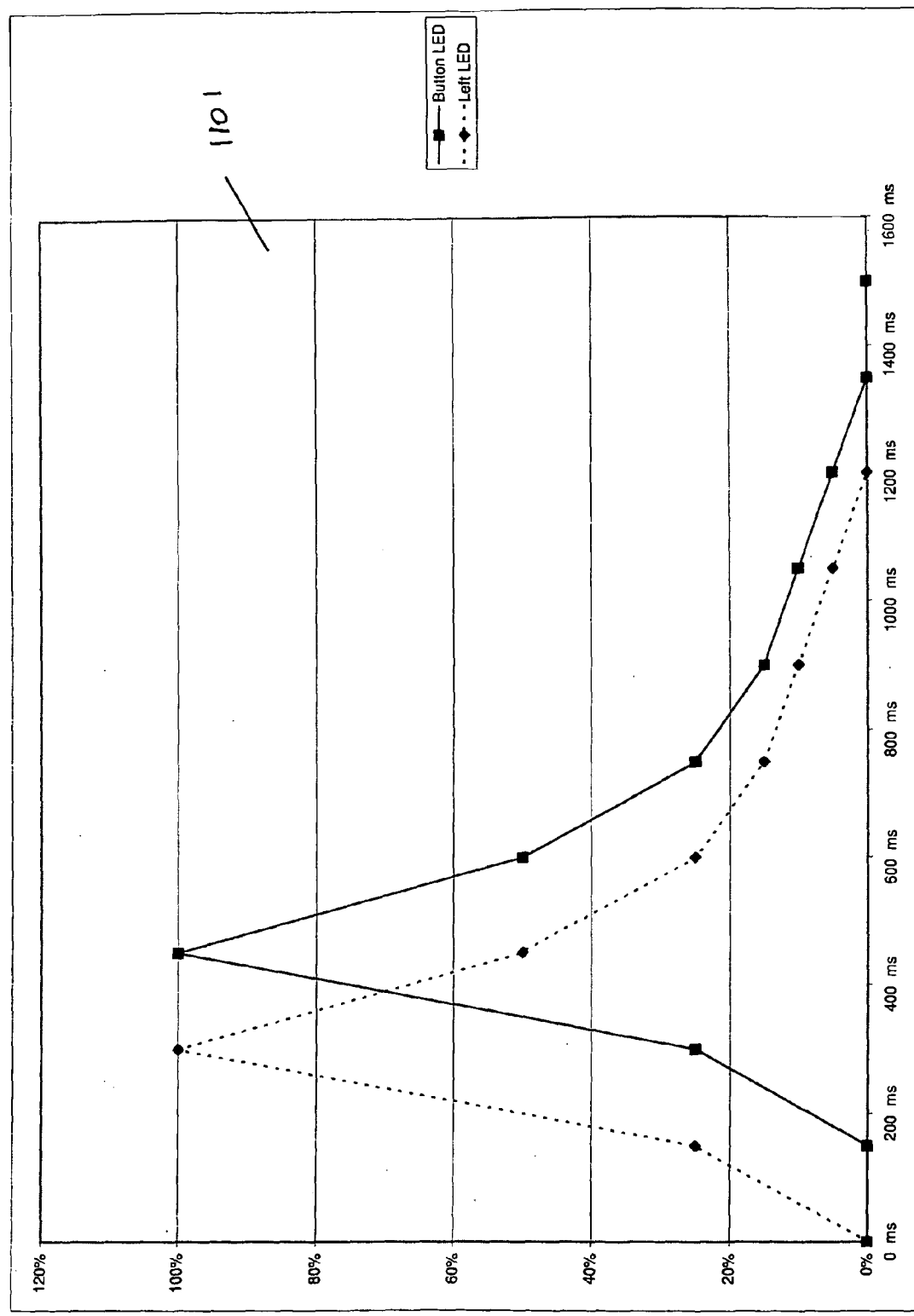
FIG. 11 is an example of a sequence graph for a half-swipe effect according to an embodiment of the invention.

Referring now to FIG. 11, there is shown a sequence graph 1101 depicting the left-to-right half-swipe pattern, according to an embodiment of the invention.

In one embodiment a timeline for a left-to-right full-swipe pattern for a device having two LEDs 201 and button 103 that can be illuminated might be specified as follows:

TABLE 2

Left-to-Right Full-Swipe Timeline

| Segment number | Time period | Illumination | | |
| --- | --- | --- | --- | --- |
| | | Left side LED(s) 201 | Button 103 | Right side LED(s) 201 |
| 0 | 0 ms | 0% | 0% | 0% |
| 1 | 150 ms | 25% | 0% | 0% |
| 2 | 150 ms | 100% | 25% | 0% |
| 3 | 150 ms | 50% | 100% | 25% |
| 4 | 150 ms | 25% | 50% | 100% |
| 5 | 150 ms | 15% | 25% | 50% |
| 6 | 150 ms | 10% | 15% | 25% |
| 7 | 150 ms | 5% | 10% | 15% |
| 8 | 150 ms | 0% | 5% | 10% |
| 9 | 150 ms | 0% | 0% | 5% |

Figure 12:
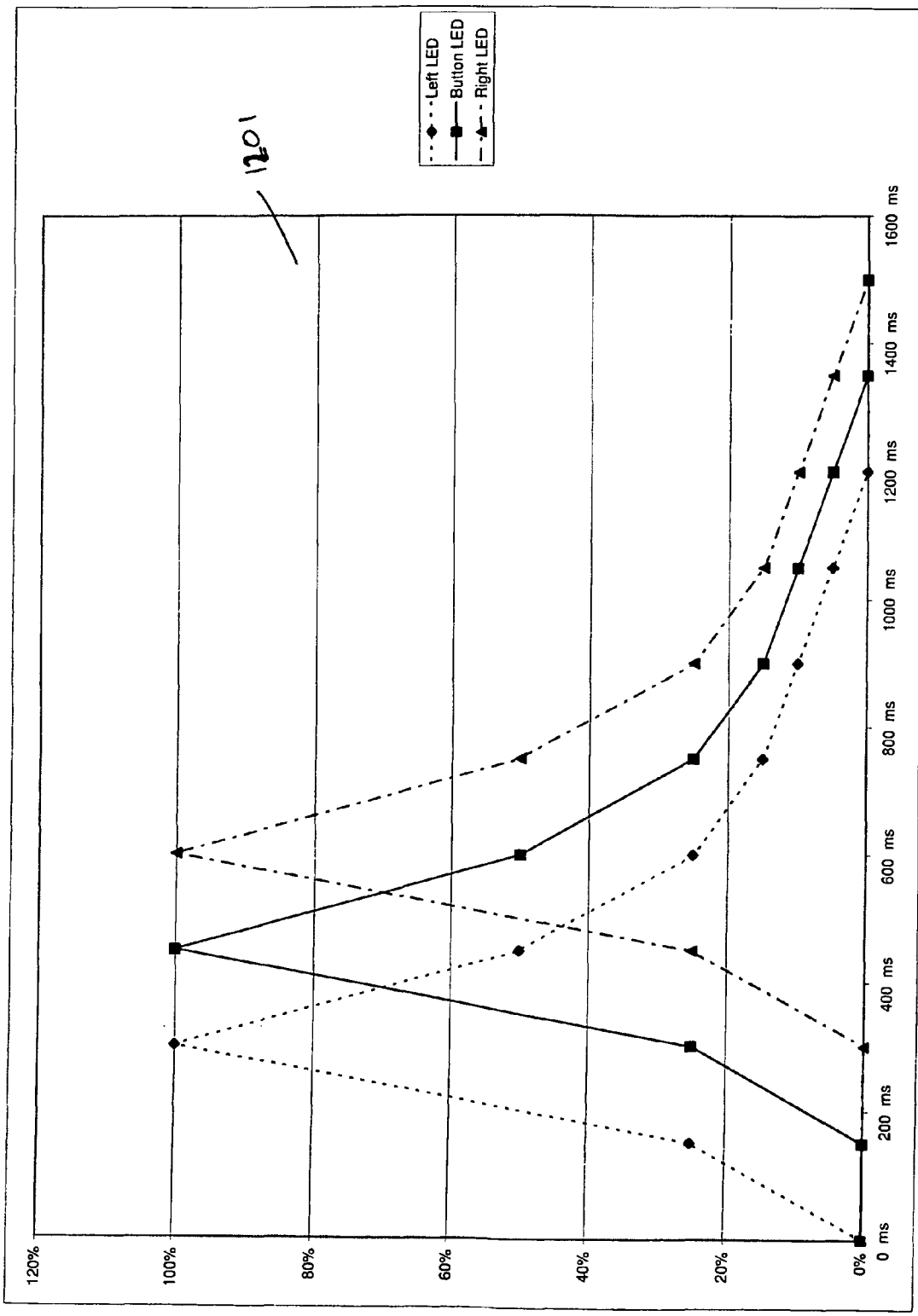
FIG. 12 is an example of a sequence graph for a full-swipe effect according to an embodiment of the invention.

Referring now to FIG. 12, there is shown a sequence graph 1201 depicting the left-to-right half-swipe pattern, according to an embodiment of the invention.

In one embodiment a timeline for a ripple pattern for a device having two LEDs 201 and button 103 that can be illuminated might be specified as follows:

TABLE 3

Ripple Timeline

| Segment number | Time period | Illumination | | |
| --- | --- | --- | --- | --- |
| | | Left side LED(s) 201 | Button 103 | Right side LED(s) 201 |
| 0 | 15000 ms | 0% | 0% | 0% |
| 1 | 500 ms | 0% | 25% | 0% |
| 2 | 200 ms | 25% | 100% | 25% |
| 3 | 50 ms | 75% | 50% | 75% |
| 4 | 50 ms | 25% | 25% | 25% |
| 5 | 200 ms | 10% | 10% | 10% |
| 6 | 500 ms | 5% | 0% | 5% |

Figure 13:
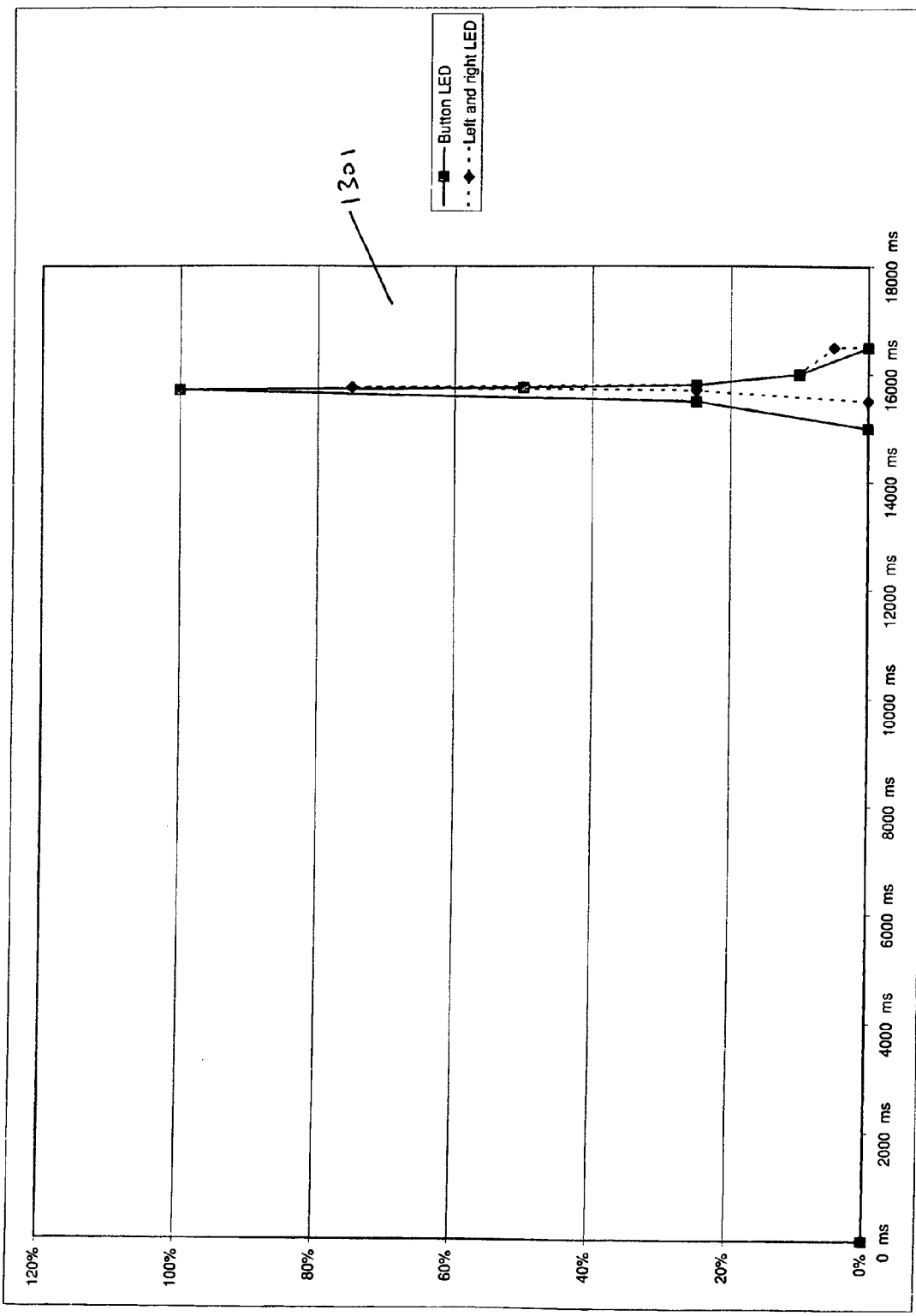
FIG. 13 is an example of a sequence graph for a ripple effect according to an embodiment of the invention.

Referring now to FIG. 13, there is shown a sequence graph 1301 depicting the ripple pattern, according to an embodiment of the invention.

In one embodiment a timeline for a breathe pattern for button 103 might be specified as follows:

TABLE 4

Breathe Timeline

| Segment number | Time period | Button 103 illumination |
|---|---|---|
| 0 | 15000 ms | 0% |
| 1 | 500 ms | 25% |
| 2 | 200 ms | 75% |
| 3 | 50 ms | 100% |
| 4 | 50 ms | 75% |
| 5 | 200 ms | 25% |
| 6 | 500 ms | 0% |

Figure 14:
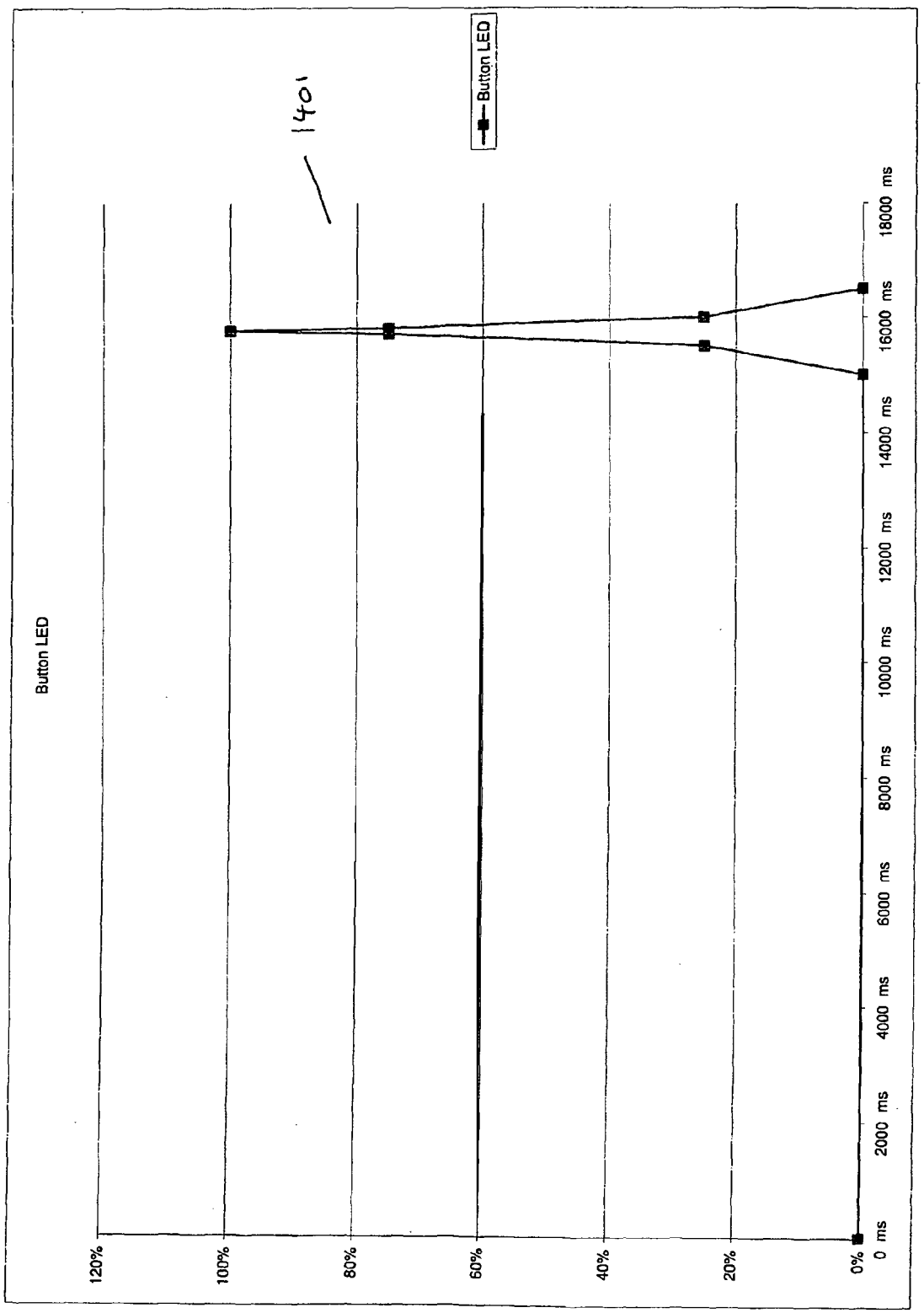
FIG. 14 is an example of a sequence graph for a breathe effect according to an embodiment of the invention.

Referring now to FIG. 14, there is shown a sequence graph 1401 depicting the breathe pattern, according to an embodiment of the invention.

In one embodiment a timeline for an arbitrary light pattern for a device having two LEDs 201 and button 103 that can be illuminated might be specified as follows:

TABLE 5

Light Pattern Timeline

| | | Illumination | | |
|---|---|---|---|---|
| Segment number | Time period | Left side LED(s) 201 | Button 103 | Right side LED(s) 201 |
| 0 | 333 ms | 0% | 100% | 0% |
| 1 | 333 ms | 0% | 100% | 0% |
| 2 | 333 ms | 0% | 0% | 0% |
| 3 | 500 ms | 0% | 0% | 0% |
| 4 | 333 ms | 100% | 0% | 100% |
| 5 | 333 ms | 100% | 0% | 100% |
| 6 | 333 ms | 0% | 0% | 0% |
| 7 | 500 ms | 0% | 0% | 0% |
| 8 | 333 ms | 100% | 100% | 100% |
| 9 | 333 ms | 100% | 100% | 100% |
| 10 | 333 ms | 0% | 0% | 0% |
| 11 | 500 ms | 0% | 0% | 0% |

Figure 15:
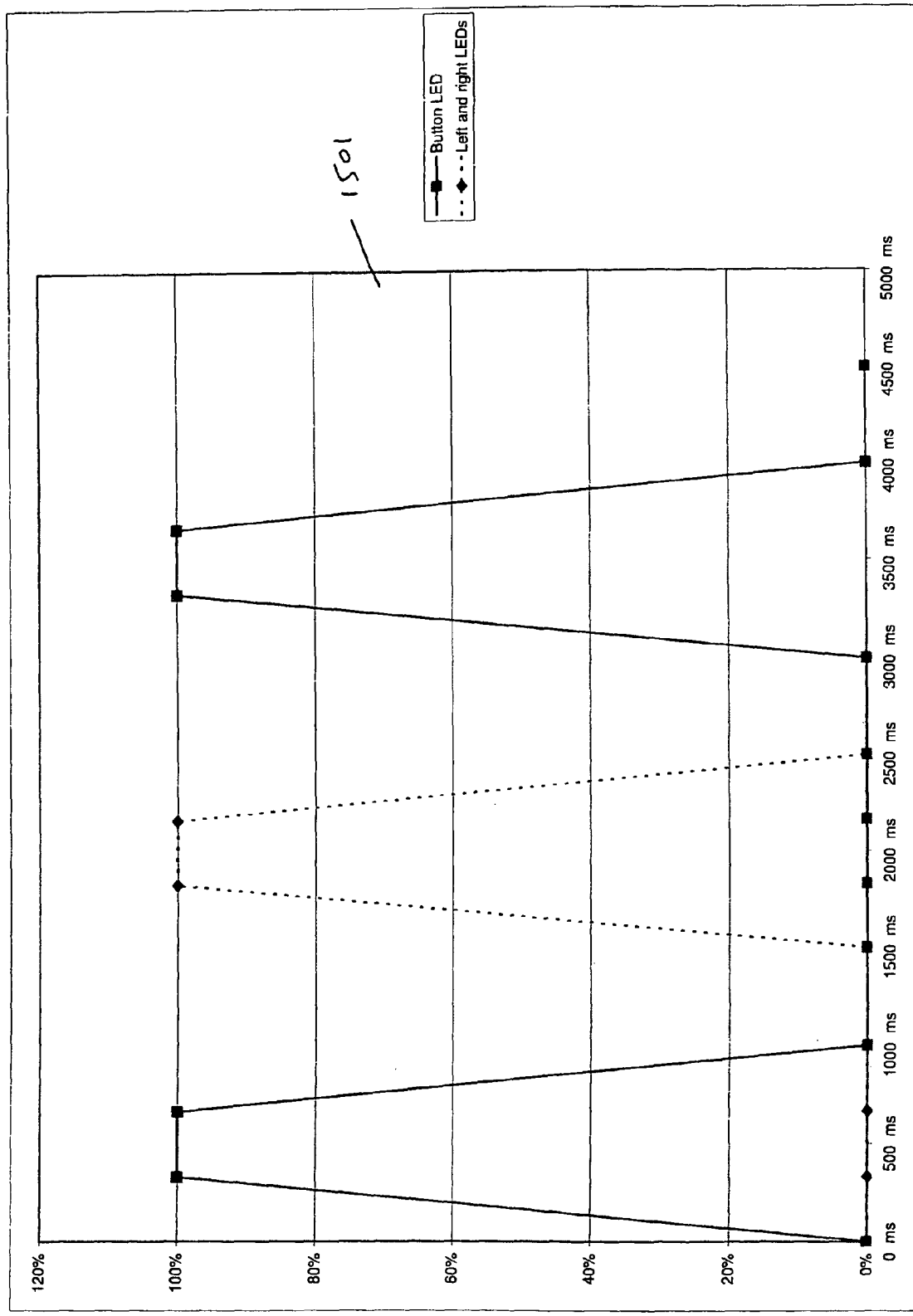
FIG. 15 is an example of a sequence graph for a light pattern according to an embodiment of the invention.

Referring now to FIG. 15, there is shown a sequence graph 1401 depicting an arbitrary light pattern, according to an embodiment of the invention.

In any of the above-described embodiments, LEDs 201 can turn on and off instantaneously or gradually, or any combination thereof.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A device for providing feedback for gesture input, comprising:
    a gesture area for detecting user input representing at least one gesture, wherein the at least one gesture corresponds to a command;
    a plurality of illuminable elements positioned linearly within the gesture area; and
    a processor configured to: (i) detect the at least one gesture, (ii) identify a command corresponding to the at least one gesture, and (iii) based on the identified command, illuminate the plurality of illuminable elements in a pattern that is indicative of the identified command by illuminating individual illuminable elements at different brightness levels for different time periods.

2. The device of claim 1, wherein the gesture area is touch-sensitive, and wherein the user input comprises user contact with the gesture area.

3. The device of claim 1, wherein the gesture area is proximity-sensitive, and wherein the user input comprises at least one gesture performed proximate to the gesture area.

4. The device of claim 1, wherein the plurality of illuminable elements comprises at least one light emitting diode.

5. The device of claim 1, wherein the plurality of illuminable elements comprises:
    at least one light emitting diode; and
    an illuminable physical button that is user-activatable by application of pressure thereon, the illuminable physical button being positioned linearly with the plurality of illuminable elements.

6. The device of claim 1, wherein the processor is configured to detect the at least one gesture selected from a group comprising:
    a swipe gesture;
    a half-swipe gesture;
    a tap-and-hold gesture;
    a scratch gesture; and
    an orbit gesture.

7. The device of claim 1, wherein the processor is configured to illuminate the plurality of illuminable elements to indicate an approximate location of the user input.

8. The device of claim 1, wherein the processor is further configured to determine at least one of a state of the device, or an event that occurs on the device, and wherein the processor is configured to illuminate the plurality of illuminable elements in a second pattern based on a detected state of the device or a detected event.

9. The device of claim 8, wherein the second pattern comprises at least one of:
    a breathe pattern;
    a pulse pattern; or
    a ripple pattern.

10. The device of claim 8, wherein the state of the device comprises at least one of:
    a sleep state;
    a low-battery state;
    a power-saving state; or
    a screen-off state.

11. The device of claim 8, wherein the event comprises at least one of:
    an error;
    an incoming message;
    a stored message;
    a missed message;
    an incoming telephone call; or
    a missed telephone call.

12. The device of claim 1, wherein the device comprises at least one of:
    a telephone;
    a smartphone;
    a personal digital assistant;
    a computer;
    a handheld computer;
    a kiosk;
    an input terminal; and
    a remote control.

13. A method for providing feedback for gesture input on a device, the method being performed by a processor and comprising:
    detecting a user input representing at least one gesture in a gesture area, the at least one gesture corresponding to a command;
    identifying a command that corresponds to the at least one gesture; and
    based on the identified command, illuminating a plurality of illuminable elements that are positioned linearly within the gesture area in a pattern that is indicative of the identified command by illuminating individual illuminable elements at different brightness levels for different time periods.

14. The method of claim 13, wherein the plurality of illuminable elements comprises at least one light emitting diode.

15. The method of claim 13, wherein the gesture area is touch-sensitive, and wherein the user input comprises user contact with the gesture area.

16. The method of claim 13, wherein illuminating the plurality of illuminable elements comprises illuminating at least one illuminable element at an approximate location of the user input.

17. The method of claim 13, further comprising determining at least one of a state of the device or an event that occurs on the device; and illuminating the plurality of illuminable elements in a second pattern based on a detected state of the device or a detected event.

18. The method of claim 17, wherein the second pattern comprises at least one of:
    a breathe pattern;
    a pulse pattern; or
    a ripple pattern.

19. The method of claim 17, wherein the state of the device comprises at least one of:
    a sleep state;
    a low-battery state;
    a power-saving state; or
    a screen-off state.

20. The method of claim 17, wherein the event comprises at least one of:
- an error;
- an incoming message;
- a stored message;
- a missed message;
- an incoming telephone call; or
- a missed telephone call.

21. A non-transitory computer-readable medium storing instructions, that when executed by one or more processors, cause the one or more processors to perform steps comprising:
- detecting a user input representing at least one gesture in a gesture area, the at least one gesture corresponding to a command;
- identifying a command that corresponds to the at least one gesture; and
- based on the identified command, illuminating a plurality of illuminable elements that are positioned linearly within the gesture area in a pattern that is indicative of the identified command by illuminating individual illuminable elements at different brightness levels for different time periods.

* * * * *